(12) United States Patent
Ohara et al.

(10) Patent No.: US 9,338,315 B2
(45) Date of Patent: May 10, 2016

(54) IMAGE COMMUNICATION APPARATUS, METHOD, AND STORAGE MEDIUM FOR PERFORMING IMAGE COMMUNICATION AND VOICE COMMUNICATION

(71) Applicant: CANON KABUSHIKI KAISHA, Tokyo (JP)

(72) Inventors: Eiji Ohara, Kawasaki (JP); Shigeru Koizumi, Tokyo (JP); Daisuke Suga, Kawasaki (JP); Michio Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 14/278,482

(22) Filed: May 15, 2014

(65) Prior Publication Data
US 2014/0347701 A1    Nov. 27, 2014

(30) Foreign Application Priority Data
May 27, 2013    (JP) .................................. 2013-111329

(51) Int. Cl.
*H04N 1/00*    (2006.01)
*H04N 1/32*    (2006.01)
(Continued)

(52) U.S. Cl.
CPC ......... *H04N 1/0048* (2013.01); *H04N 1/32704* (2013.01); *H04N 1/32784* (2013.01);
(Continued)

(58) Field of Classification Search
CPC ............ H04M 7/0006; H04M 7/0003; H04M 7/0069; H04M 1/2535; H04M 1/253; H04M 1/247; H04M 1/2473; H04M 1/2477; H04M 11/06; H04M 11/066; H04L 65/1069; H04L 65/1083; H04L 29/06; H04L 69/18; H04L 1/0025; H04L 2012/6481; H04L 67/00
USPC ......... 358/1.15, 400, 440, 442, 425; 704/201, 704/235; 370/370, 252, 351, 352, 328, 338, 370/389, 401, 254, 360
See application file for complete search history.

(56) References Cited

U.S. PATENT DOCUMENTS 7,283,270 B2 * 10/2007 Boire-Lavigne .... H04L 12/5835
358/1.15
7,471,779 B2 * 12/2008 Kajiwara .............. H04M 15/06
379/100.1

(Continued)

FOREIGN PATENT DOCUMENTS

JP    2005-086724 A    3/2005

OTHER PUBLICATIONS

Procedures for real-time Group 3 facsimile communication over IP networks. 2010 pp. 1-157 (International Telecommunication Union).*

*Primary Examiner* — Mohammad Ghayour
*Assistant Examiner* — Jonathan R Beckley
(74) *Attorney, Agent, or Firm* — Carter, DeLuca, Farrell & Schmidt, LLP

(57) ABSTRACT

A present image communication apparatus performs voice communication with an external apparatus via a network, acquires image communication information indicating an image communication capability of the external apparatus, displays an operation screen that is related to image communication and includes at least information indicating whether or not voice communication can be continued when performing image communication based on the acquired image communication information, and controls image communication in accordance with user input that has been made via the operation screen.

9 Claims, 16 Drawing Sheets

(51) Int. Cl.
*G06F 3/12* (2006.01)
*H04N 1/327* (2006.01)
*H04N 1/333* (2006.01)

(52) U.S. Cl.
CPC ....... *H04N1/32797* (2013.01); *H04N 1/33307* (2013.01); *H04N 1/33376* (2013.01); *H04N 1/33392* (2013.01)

(56) References Cited

U.S. PATENT DOCUMENTS

| | | | | |
|---|---|---|---|---|
| 7,701,931 B2* | 4/2010 | Kajiwara | ........... | H04N 1/00214 358/400 |
| 7,791,748 B2* | 9/2010 | Izumi | ................ | H04N 1/00214 358/1.15 |
| 7,912,043 B2* | 3/2011 | Kubler | ................ | G06F 1/1626 370/352 |
| 8,027,335 B2* | 9/2011 | Ansari | ............... | H04L 12/2803 370/353 |
| 8,037,138 B2* | 10/2011 | Izumi | ................ | H04L 12/2856 358/400 |
| 8,174,718 B2* | 5/2012 | Higuchi | .............. | H04M 11/066 358/1.15 |
| 8,238,380 B2* | 8/2012 | D'Angelo | ............... | H04L 12/14 370/352 |
| 8,416,436 B2* | 4/2013 | Sakata | ................... | H04N 1/327 358/1.15 |
| 8,587,801 B2* | 11/2013 | Fahrenthold | ....... | H04N 1/00209 358/1.15 |
| 8,891,748 B2* | 11/2014 | Rand | ................ | H04M 3/42382 379/201.11 |
| 8,908,841 B2* | 12/2014 | Inoue | ................ | H04M 11/066 379/100.15 |
| 8,909,693 B2* | 12/2014 | Frissora | ................. | G06F 9/543 709/203 |
| 2004/0184110 A1* | 9/2004 | Maei | ................. | H04N 1/00209 358/400 |
| 2005/0213569 A1* | 9/2005 | Kajiwara | ...................... | 370/356 |
| 2006/0136596 A1* | 6/2006 | Izumi | ................. | H04L 12/5692 709/230 |
| 2008/0130554 A1* | 6/2008 | Gisby | ................ | H04M 3/4234 370/328 |
| 2010/0217876 A1* | 8/2010 | Fikouras | ................ | H04L 69/16 709/228 |

* cited by examiner

FIG. 5
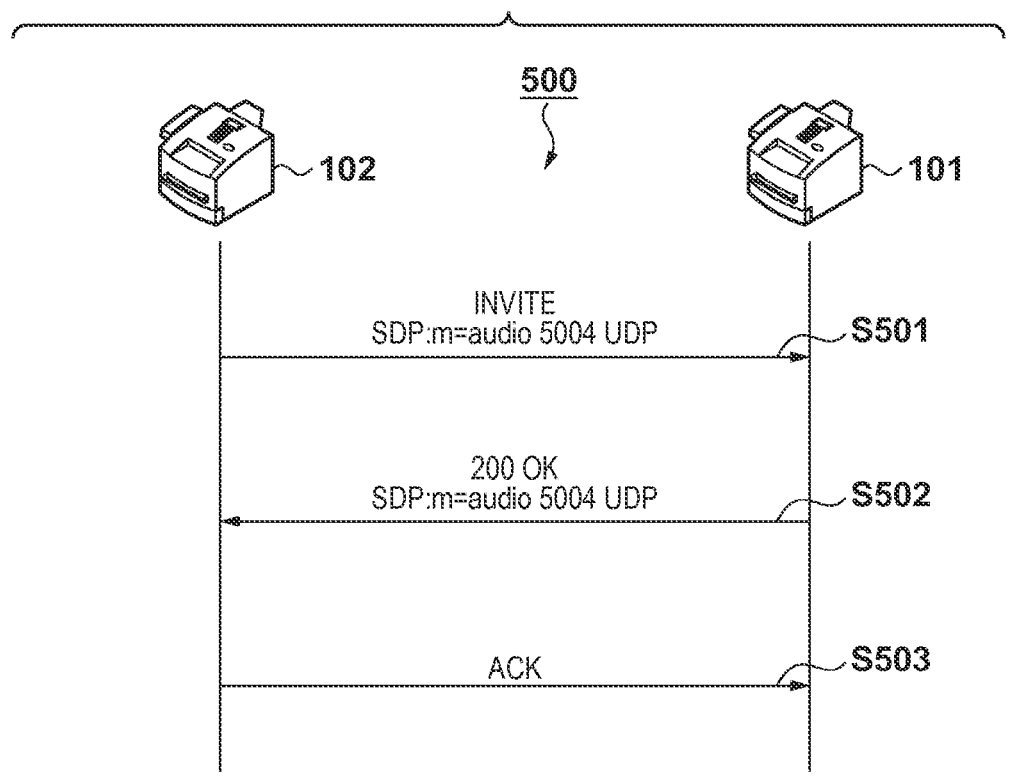
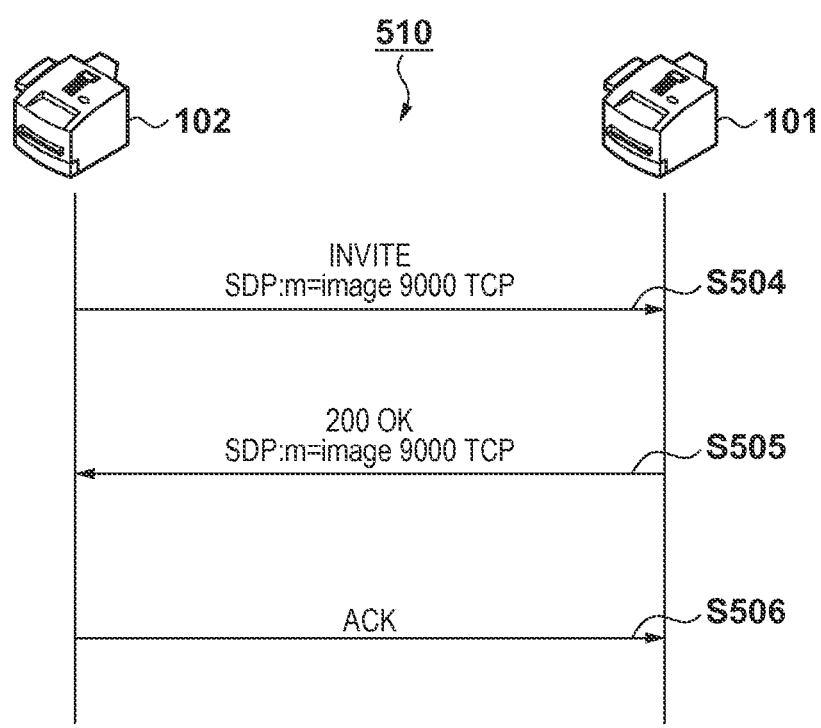

FIG. 6

| IMAGE COMMUNICATION INFORMATION | | | |
|---|---|---|---|
| DESTINATION | NUMBER | UPDATED DATE | CONTINUED SPEECH COMMUNICATION |
| A PLANNING | 03xxx | 2011/3/18 | OK |
| B PLANNING | 045xxx | 2005/5/20 | NG |

CONTINUE SPEECH COMMUNICATION
DURING IMAGE COMMUNICATION?

YES    NO    CANCEL

702

SPEECH COMMUNICATION IS
DISCONNECTED DURING IMAGE COMMUNICATION.

YES    CANCEL

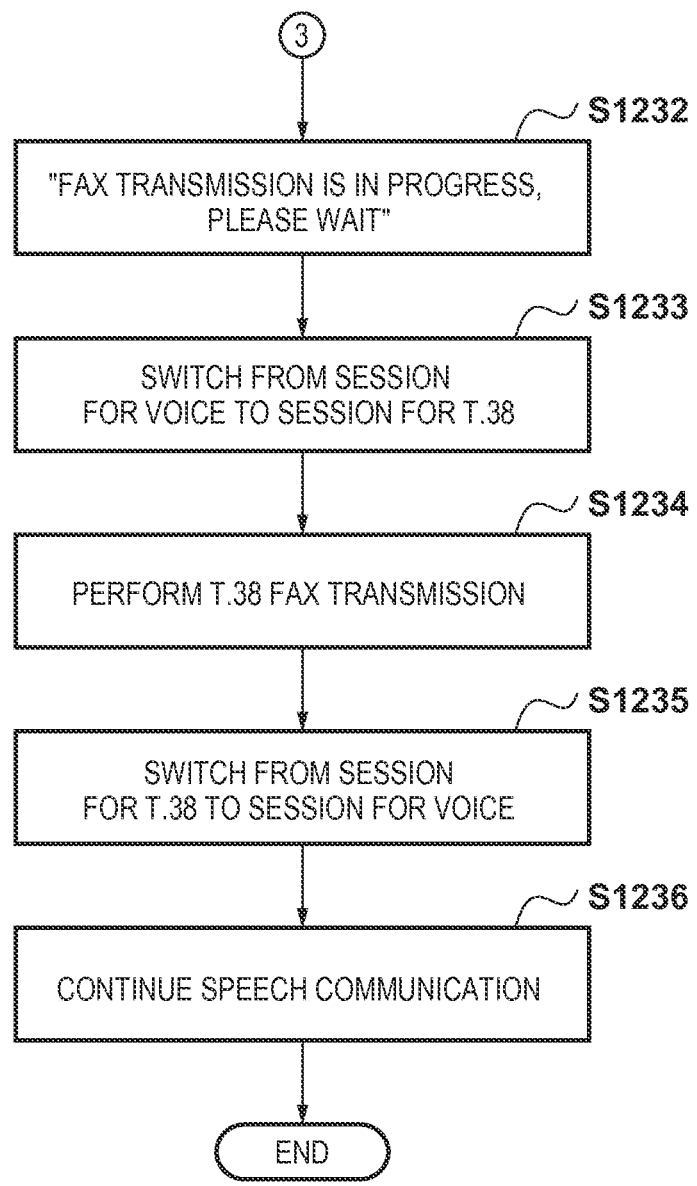

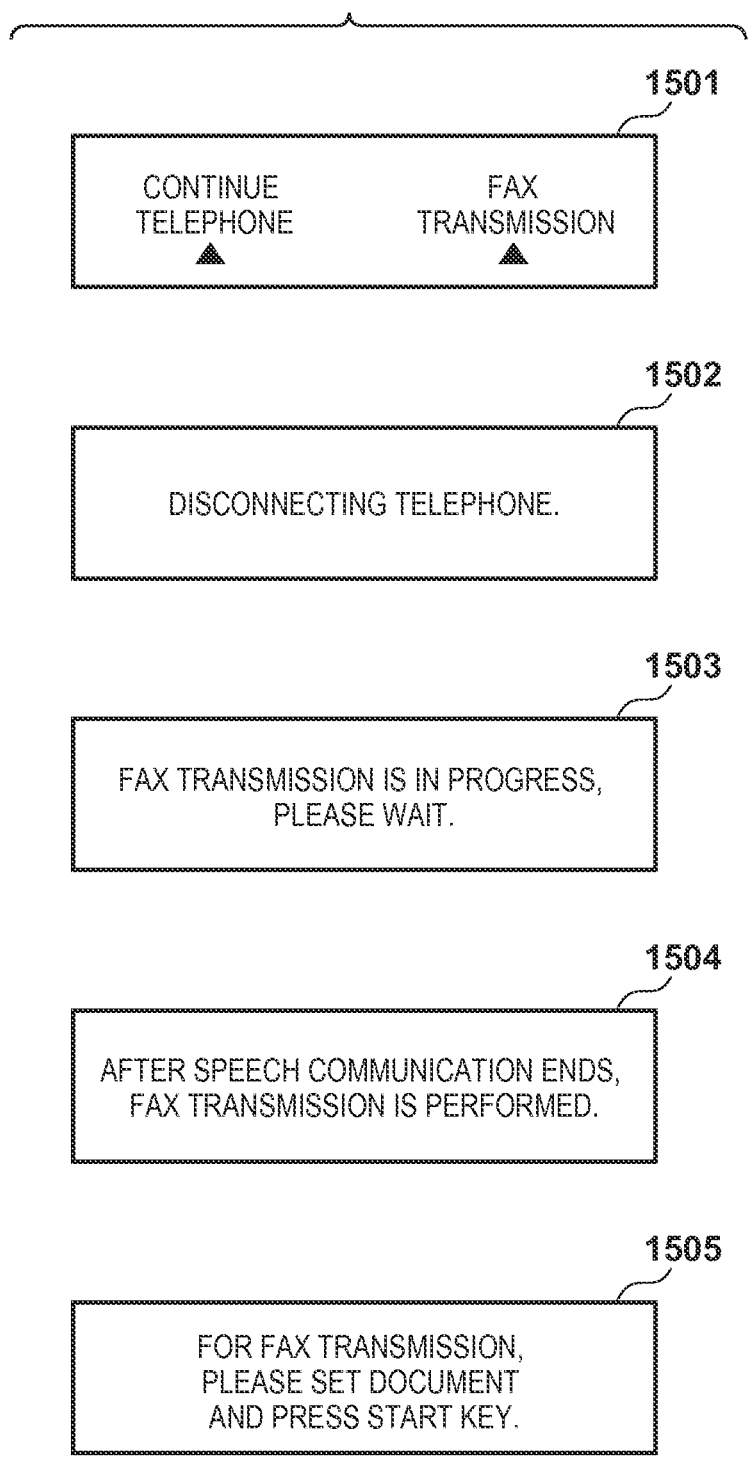

IMAGE COMMUNICATION APPARATUS, METHOD, AND STORAGE MEDIUM FOR PERFORMING IMAGE COMMUNICATION AND VOICE COMMUNICATION

BACKGROUND OF THE INVENTION

1. Field of the Invention

The present invention relates to an image communication apparatus, a control method therefor, and a storage medium.

2. Description of the Related Art

In recent years, replacement of a conventional circuit-switched telephone network with a network based upon IP (Internet Protocol) techniques has led to widespread dissemination of techniques to provide services via a LAN or an NGN (Next-Generation Network). Here, the NGN denotes an IP network that itself has a bandwidth guarantee function and a security function and realizes a telephone service, a video communication service, a data communication service, and the like in an integrative manner.

A virtual session is established between communication apparatuses in such a LAN or an NGN, and there has been a widespread use of a SIP (Session Initiation Protocol) that guarantees services during a valid session. Various forms of services have been proposed to perform speech communication or image communication, or to perform them simultaneously, using protocols such as the IP and VoIP (Voice Over IP) on a communication apparatus that has established a session using this SIP (Japanese Patent Laid-Open No. 2005-86724). Examples of this image communication include facsimile communication according to a digital facsimile procedure compliant with the ITU-T recommendation T.38, and facsimile communication according to a digital facsimile procedure compliant with the ITU-T recommendation T.30 (T.30 facsimile communication based on deemed voice of VoIP).

However, the foregoing conventional technique has the following problems. In order to perform speech communication and image communication with various communication apparatuses in a LAN or an NGN, it is necessary to comply with a plurality of protocols, and further to perform communication control in accordance with a communication capability of the other party. For example, in the case of image communication during speech communication, in the case where the other party has a single session, and in the case of VoIP, speech communication and the image communication cannot be performed simultaneously, and other restrictions may apply. However, ordinarily, a user does not particularly pay attention to such protocol differences and a communication capability of the other party. Therefore, even if an attempt is made to perform image communication with continuation of speech communication, it may not be possible to continue speech communication depending on used protocols and functions of a communication apparatus of the other party. Moreover, the user cannot know of such things ahead of time, which disadvantageously contributes to user-unfriendliness of communication functions.

SUMMARY OF THE INVENTION

The present invention enables realization of a mechanism for allowing confirmation of a capability of a communication apparatus of the other party ahead of time and efficiently performing image communication in accordance with the capability of the communication apparatus of the other party in the case where speech communication and image communication are performed together.

One aspect of the present invention provides an image communication apparatus comprising: a detection unit configured to detect an instruction for performing image communication in succession to voice communication with an external apparatus with which communication can be performed via a network; a voice communication unit configured to perform voice communication with the external apparatus; an acquisition unit configured to acquire image communication information indicating an image communication capability of the external apparatus; a display unit configured to display an operation screen related to image communication based on the image communication information acquired by the acquisition unit, the operation screen including at least information indicating whether or not voice communication can be continued when performing image communication; and a control unit configured to control image communication in accordance with user input that has been made via the operation screen displayed by the display unit.

Another aspect of the present invention provides a control method for an image communication apparatus, comprising: detecting, by a detection unit, an instruction for performing image communication in succession to voice communication with an external apparatus with which communication can be performed via a network; performing, by a voice communication unit, voice communication with the external apparatus; acquiring, by an acquisition unit, image communication information indicating an image communication capability of the external apparatus; displaying, by a display unit, an operation screen related to image communication based on the acquired image communication information, the operation screen including at least information indicating whether or not voice communication can be continued when performing image communication; and controlling, by a control unit, image communication in accordance with user input that has been made via the displayed operation screen.

Further features of the present invention will be apparent from the following description of exemplary embodiments with reference to the attached drawings.

BRIEF DESCRIPTION OF THE DRAWINGS

FIG. 5 shows sequences for establishing a SIP session according to the first embodiment.

FIG. 6 shows an example of a table of image communication information stored in an HDD according to the first embodiment.

FIG. 7 shows examples of tables of image communication information stored in the HDD according to the first embodiment.

FIGS. 12A to 12C are flowcharts showing a processing flow according to a third embodiment.

FIG. 15 shows examples of screens displayed on an operation panel according to the third embodiment.

DESCRIPTION OF THE EMBODIMENTS

Figure 1:
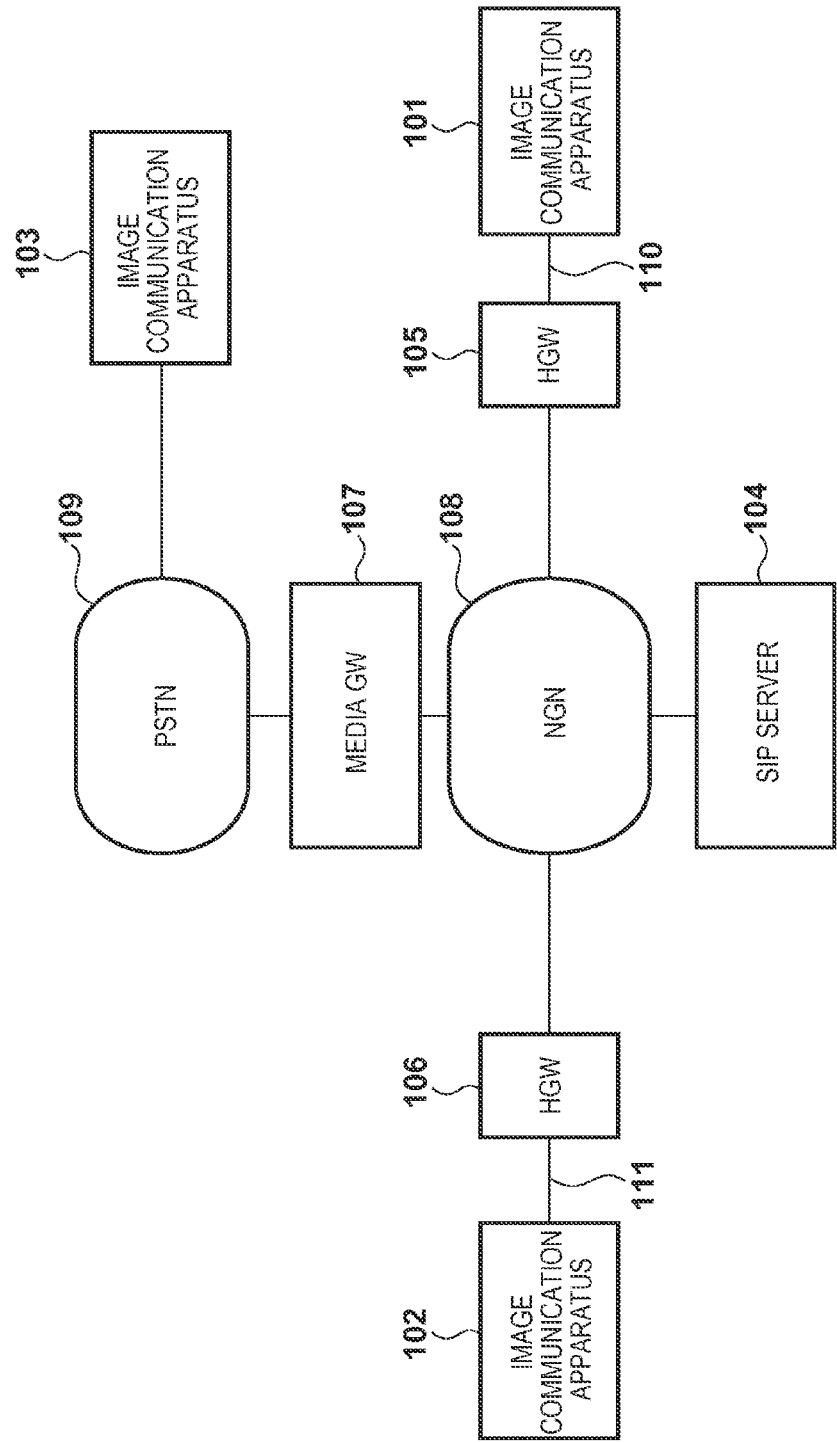
FIG. 1 shows a configuration of a network system that is applicable in a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Network System>

The following describes a first embodiment of the present invention with reference to FIGS. 1 to 10. First, a description is given of a configuration of a network system to which the present embodiment is applicable with reference to FIG. 1.

A SIP server 104, home gateways 105, 106, and a media gateway 107 are connected in an NGN 108. The SIP server 104 provides a SIP (Session Initiation Protocol) service, such as conversion of telephone numbers and IP addresses, in order to execute call connection processing for IP telephone services and IP facsimile communication. An image communication apparatus 101 is communicably connected to image communication apparatuses 102, 103 via the aforementioned relay apparatuses.

The home gateways 105, 106 are connected so as to perform relay operations between the NGN 108 and the image communication apparatuses 101, 102, respectively. The home gateways 105, 106 are connected to the image communication apparatuses 101, 102 via CSMA/CD interfaces 110, 111, respectively. They are interface apparatuses that perform facsimile communication according to a digital facsimile procedure compliant with the ITU-T recommendation T.38, and facsimile communication according to a digital facsimile procedure compliant with the ITU-T recommendation T.30 (T.30 facsimile communication based on deemed voice of VoIP). Here, VoIP is an acronym of Voice over Internet Protocol. The image communication apparatuses 101, 102 perform SIP-compliant call connection as well as communication compliant with the ITU-T standard T.38 via the NGN 108. The SIP server 104 defined by the Session Initiation Protocol in RFC 3261 of the IETF is used in SIP-compliant call connection.

The media gateway 107 is installed by a telephone carrier or a network carrier for connection between the NGN 108 and a PSTN 109. The media gateway 107 performs digital/analog signal conversion between voice signals and IP packets, and controls an outgoing call to a subscriber terminal (e.g., a voice terminal) connected to the PSTN 109. The image communication apparatus 103 is a G3 analog facsimile apparatus connected to the PSTN 109, and performs facsimile communication in accordance with an analog facsimile procedure compliant with the ITU-T recommendation T.30.

<Configuration of Image Communication Apparatus>

Figure 2:
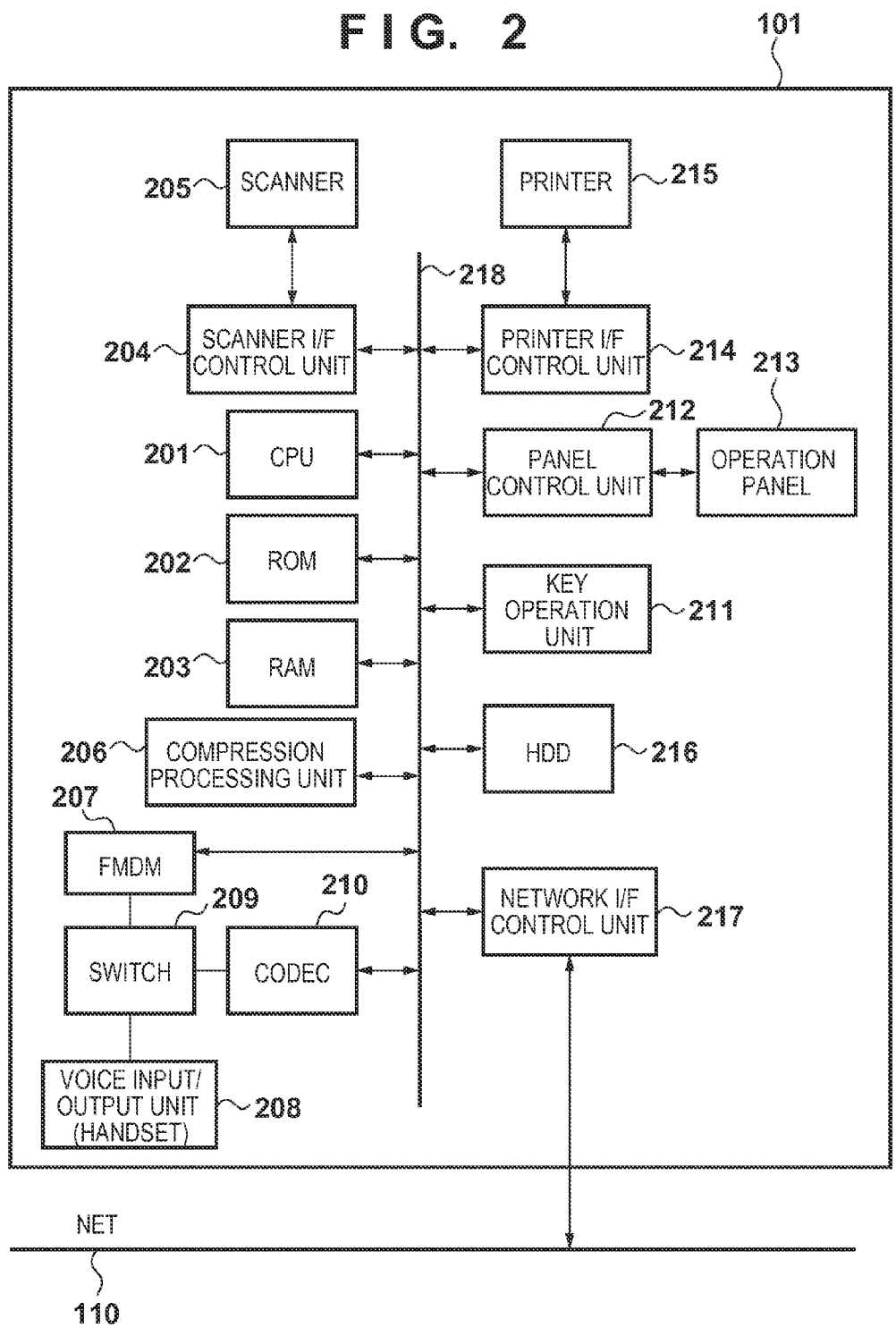
FIG. 2 is a block diagram showing a hardware configuration of an image communication apparatus with a function according to the first embodiment.

A hardware configuration of the image communication apparatus 101 according to the present embodiment will now be described with reference to FIG. 2. In FIG. 2, a CPU 201 controls an entirety of the image communication apparatus in accordance with programs stored in a ROM (read-only memory) 202. The CPU 201 also executes TCP/IP protocol processing and controls incorporation of image data into TCP/IP frames. A RAM (random-access memory) 203 is used as a working memory at the time of execution of programs, and also used in buffering image data to be transmitted and received.

A scanner I/F control unit 204, which is an apparatus for controlling a scanner 205, converts a read image of a document into digital data; under control of the CPU 201, the converted digital data is transferred to the RAM 203, and then transmitted or output for recording as will be described later. A compression processing unit 206, which is a coding/decoding processing unit incorporating an MH, MR, MMR or JBIG method, compresses read image data by way of coding at the time of image transmission, and decodes coded image data at the time of reception.

At the time of transmission, a FAX modem 207 modulates coded data so as to convert the coded data into an analog signal of a voice band that can be transmitted via an analog line. At the time of reception, it demodulates a received analog signal and outputs coded data. A voice input/output unit (handset) 208 is composed of a microphone to which voice is input and a speaker from which voice is output.

An analog switch 209 can connect one of the FAX modem 207 and the voice input/output unit 208 to a CODEC 210. In the present embodiment, the CODEC 210 supports a VoIP-based coding/decoding method for a facsimile signal that is transmitted and received as a voice signal or deemed voice. It also supports at least a coding/decoding method necessary for transmitting and receiving a T.38 Internet facsimile signal (especially a tone signal).

A key operation unit 211 is composed of a dial, operation buttons for facsimile transmission/reception, and the like, and receives operation instructions from a user. A panel control unit 212 controls an operation panel 213 that displays various types of information and receives instructions from the user as input. A printer I/F control unit 214, which is an apparatus for controlling a printer 215 incorporating an electrophotography method, an inkjet method, or any other recording method, converts image data that has been received (or input through other methods) into raster data for printing, and outputs the raster data for printing. An HDD (hard disk drive) 216 is used in storing data for printing and other various types of data.

A network I/F control unit 217 is a LAN controller, and transmits/receives data to/from the home gateway 105 (106) via the CSMA/CD interface 110 (111). Once data to be transmitted is transferred to the network I/F control unit 217, the data is transmitted to the CSMA/CD interface 110 after a MAC (Media Access Control) frame header, an FCS (Frame Check Sequence), and the like are added thereto. The CPU 201, RAM 203, scanner 205, compression processing unit 206, FAX modem 207, CODEC 210, network I/F control unit 217, and the like are connected to a system bus 218 via which a control signal from the CPU 201 and a data signal between various apparatuses are transmitted/received.

<Configuration of Operation Panel>

Figure 3:
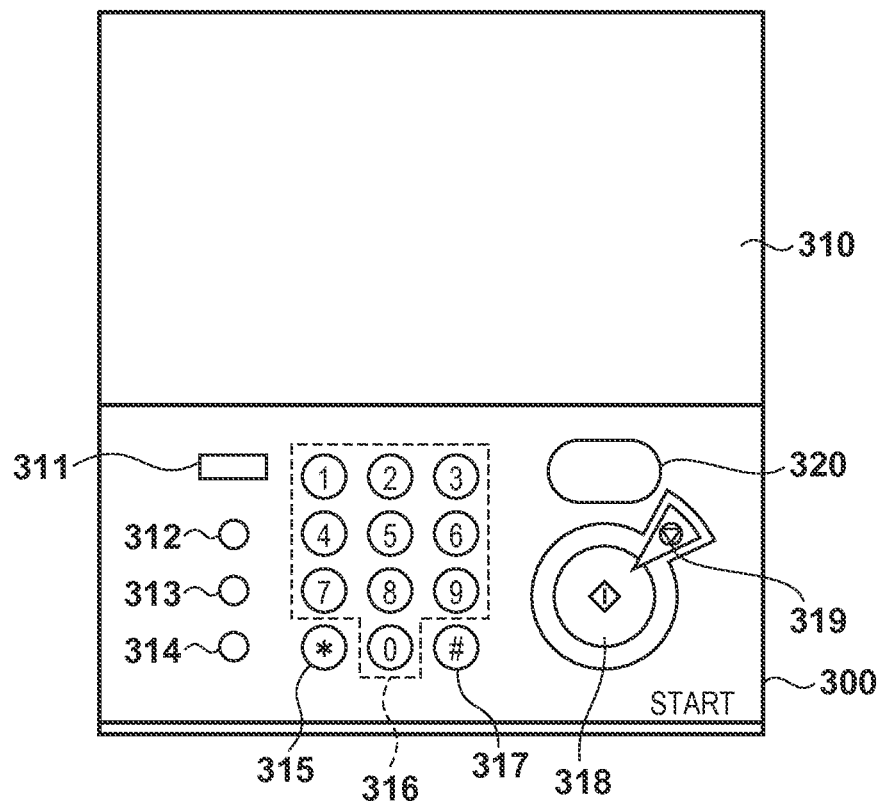
FIG. 3 is a plan view showing a configuration of an operation panel according to the first embodiment.

A description is now given of a configuration of an operation panel with reference to FIG. 3. An operation panel 300 shown in FIG. 3 is composed of the key operation unit 211 and the operation panel 213. The operation panel 300 includes a liquid crystal screen 310, a reset key 311, a guide key 312, a user mode key 313, an interruption key 314, a security key 315, numeric keys 316, a clear key 317, a start key 318, a stop key 319, and a power on/off key 320.

The liquid crystal screen 310 displays configured settings and operation statuses of the apparatus, and allows input of setting information through pressing of, for example, software keys on a touchscreen (not shown in the drawings) mounted on the liquid crystal screen 310. The reset key 311 resets the configured settings to a default mode. The guide key 312 causes the liquid crystal screen 310 to display a screen presenting an explanation of an operation procedure. The user mode key 313 is for entering a mode for configuring various settings for the apparatus. The interruption key 314 stops an operation of the apparatus temporarily for execution of other job operations. The security key 315 is for inputting a personal identification number and the like using the numeric keys 316 in a security mode in which the apparatus cannot be used unless security information is input. The numeric keys 316 are for inputting the number of copies or values of various settings, such as destination numbers. The clear key 317 is for clearing an input value. The start key 318 is for inputting an instruction for causing the apparatus to start an image communication operation. The stop key 319 stops the image communication operation. The power on/off key 320 turns on/off the power of the apparatus on a software basis, and the main power may be turned off by, for example, pressing this power on/off key 320 for a long time.

<Processing Procedure>

Figure 4:
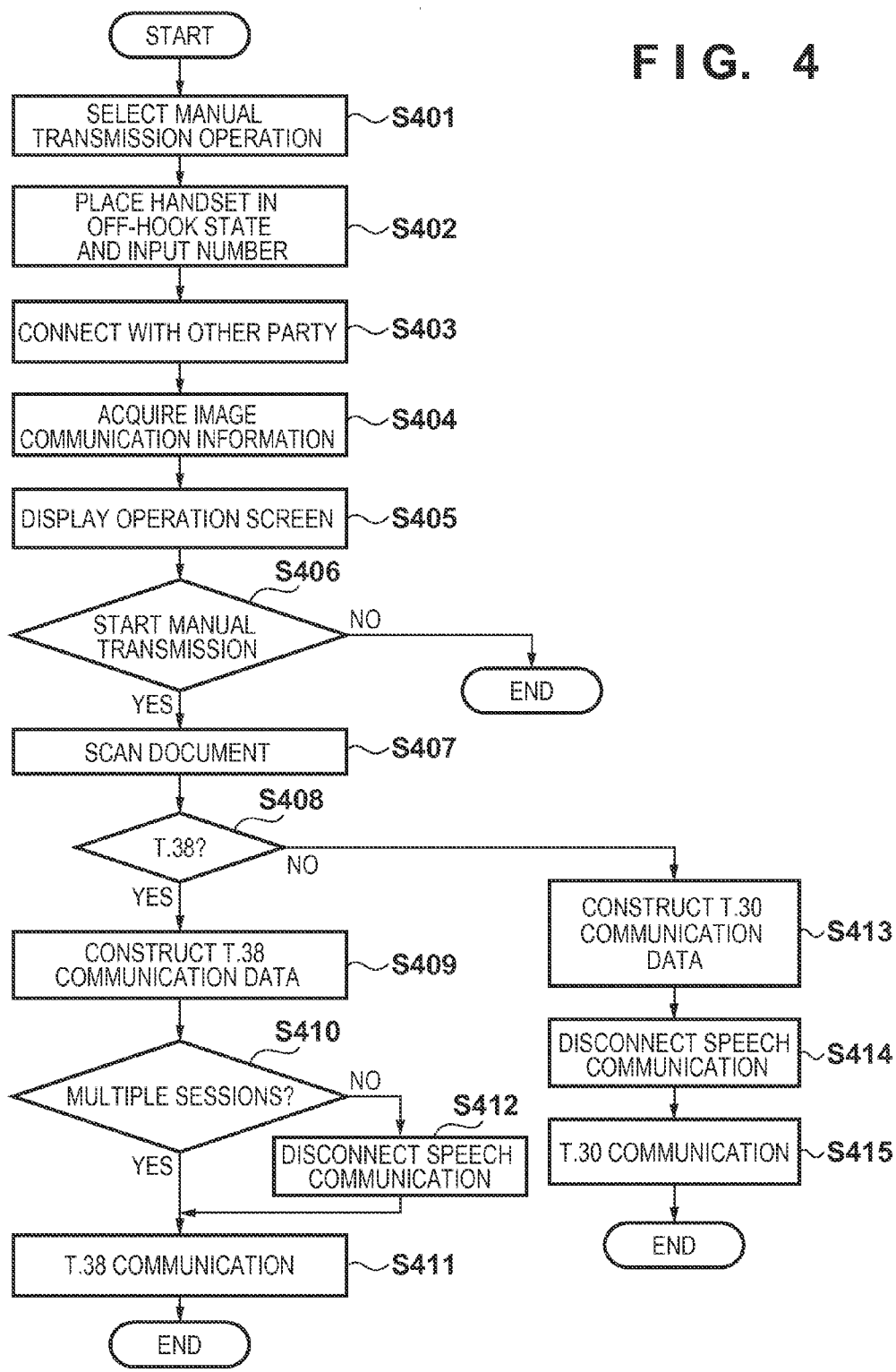
FIG. 4 is a flowchart showing a processing flow according to the first embodiment.

A description is now given of a processing procedure according to the present embodiment with reference to FIG. 4. Specifically, the following describes a manual transmission operation of a facsimile function in which, unlike an ordinary case where a destination number is input and image communication is performed without performing speech communication, image communication is performed in succession to confirmation of a destination during speech communication. This manual transmission operation makes it possible to confirm directly with the other party of speech communication whether or not the destination is accurate before performing the image communication, and also to reliably deliver the image after confirming with the other party, thereby preventing troubles such as misunderstanding between a calling party and a called party as to whether or not the image has been communicated. It should be noted that the processing procedure is realized by the CPU 201 of the image communication apparatus 101, which will be described below, reading a control program pre-stored in the ROM 202, the HDD 216, and the like into the RAM 203 and executing the read control program.

In step S401, the CPU 201 selects the manual transmission operation of the facsimile function through pressing of, for example, a software key displayed on the liquid crystal screen 310 of the operation panel 300. Next, in step S402, the CPU 201 detects input of a destination number via the numeric keys 316 after the handset 208 is lifted and placed in an off-hook state by an operator. Thereafter, in step S403, the CPU 201 establishes a SIP session with a terminal of a called party using the SIP function and starts a connection operation. In a SIP session, a terminal of a calling party transmits a SIP session establishment request (INVITE) to a terminal of a called party, and the terminal of the called party returns a success response to the terminal of the calling party in response to the received INVITE. Upon receiving the success response, the terminal of the calling party transmits ACK to the terminal of the called party, thus establishing the SIP session. A medium used in the SIP session is determined by the calling party and the called party exchanging with each other an SDP (Session Description Protocol) describing, for example, a medium they wish to use and a port number for receiving the medium (SDP negotiation).

Sequences for establishing a SIP session will now be described with reference to FIG. 5. A sequence 500 of FIG. 5 pertains to the case where the image communication apparatus (external apparatus) 102 according to the present embodiment wishes to establish a SIP session by transmitting a SIP connection request message (INVITE) including an offer SDP to the image communication apparatus 101.

In step S501, the image communication apparatus 102 transmits an INVITE message to the image communication apparatus 101. The INVITE message includes an SDP describing media information and a receiving port number that are wished to be used in the SIP session. Here, with the objective of performing speech communication, the description m=audio 5004 UDP indicates a proposal for establishment of a SIP session for performing data communication for media-type information of audio (voice) using a UDP port number 5004.

In step S502, when the image communication apparatus 101 receives the INVITE message addressed to itself, it examines the offer SDP included in the INVITE message, and transmits a 200 OK message if the offer SDP describes compatible media information. The 200 OK message includes an SDP describing media information and a receiving port number accepted by the image communication apparatus 101. In the present embodiment, the description m=audio 5004 UDP indicates agreement on establishment of the SIP session for performing data communication for media-type information of audio using a UDP port number 5004 as a receiving port.

In step S503, upon receiving the 200 OK message, the image communication apparatus 102 transmits an ACK message indicating that the 200 OK message has been received. Consequently, the SIP session for realizing data communication based on the media information that both of the image communication apparatuses 101 and 102 have agreed on is established therebetween.

Alternatively, a session for media-type information other than the foregoing audio may also be established. A sequence 510 of FIG. 5 pertains to the case where the image communication apparatus 102 according to the present embodiment wishes to establish another SIP session by transmitting a SIP connection request message (INVITE) including an offer SDP to the image communication apparatus 101.

In step S504, the image communication apparatus 102 transmits an INVITE message to the image communication apparatus 101. The INVITE message includes an SDP describing media information and a receiving port number that are wished to be used in the SIP session. Here, with the objective of image communication, the description m=image 9000 TCP indicates a proposal for establishment of a SIP session for performing data communication for media-type information of image using a TCP port number 9000.

In step S505, when the image communication apparatus 101 receives the INVITE message addressed to itself, it examines the offer SDP included in the INVITE message, and transmits a 200 OK message if the offer SDP describes compatible media information. The 200 OK message includes an SDP describing media information and a receiving port number accepted by the image communication apparatus 101. In the present embodiment, the description m=image 9000 TCP indicates agreement on establishment of the SIP session for performing data communication for media-type information of image using a TCP port number 9000 as a receiving port.

In step S506, upon receiving the 200 OK message, the image communication apparatus 102 transmits an ACK message indicating that the 200 OK message has been received. Consequently, the SIP session for realizing data communication based on the media information that both of the image communication apparatuses 101 and 102 have agreed on is established therebetween.

The description of FIG. 4 will now be continued. Once speech communication via voice has become possible with the establishment of the SIP session for media-type information of audio as shown in the sequence 500 of FIG. 5, the CPU 201 acquires image communication information from the HDD 216 in parallel with voice communication in step S404. Furthermore, in step S405, the CPU 201 displays an operation screen based on this image communication information on the liquid crystal screen 310. This image communication information is used in performing image communication for determination of whether or not speech communication can be continued, or whether or not to continue speech communication, at the time of the manual transmission operation.

The following describes an example of a table of image communication information stored in the HDD 216 with reference to FIG. 6. As shown in FIG. 6, the table includes the following items: "destination", "destination number", "updated date", and "continued speech communication". The destination defines the name of a destination. The destination number defines a destination address for establishing communication. The updated date and time define the date and time when this image communication information was updated. OK or NG indicating whether or not image communication can be performed with continuation of voice communication is set as the continued speech communication, that is to say, the continued speech communication defines whether or not speech communication with the present destination can be continued. In this manner, the continued speech communication indicates whether the "continued speech communication" is OK or NG with respect to the "destination number".

If the foregoing image communication information is known ahead of time, it can be created by pre-registering it in the HDD 216. If the manual transmission operation has been performed at least once in the past, the image communication information can be created automatically based on a communication history thereof and registered in the HDD 216. Alternatively, if a predetermined period of time has elapsed since the updated date, there is a possibility that the image communication information has been changed, and therefore it is permissible to perform the manual transmission operation again without using the existing image communication information and acquire image communication information based on a new communication history. In this case, for example, as the image communication information is not used, information equivalent to the image communication information is acquired through, for example, user input. Alternatively, an inquiry may be made directly to the image communication apparatus 102 of the other party as will be described later with reference to FIG. 9. The CPU 201 acquires the image communication information in step S404 by reading the created image communication information from the HDD 216, judges whether or not "continued speech communication" is possible by comparing the acquired image communication information with the destination number input in step S402, and displays an operation screen corresponding to this judgment on the liquid crystal screen 310 in step S405.

Below is a description of examples of the operation screen that has been acquired from the image communication information and is displayed on the liquid crystal screen 310 with reference to FIG. 7. In FIG. 7, 701 is an example of a displayed operation screen that allows selection of whether or not to continue voice communication at the time of image communication in the case where OK is set as "continued speech communication", that is to say, speech communication can be continued. At the time of the manual transmission operation, whether or not to continue speech communication (step S406-YES) is selected via a display key YES or NO, or whether or not to cancel the manual transmission operation (step S406-NO) can be selected via a display key CANCEL. In FIG. 7, 702 is an example of an operation screen displayed in the case where NG is set as "continued speech communication", that is to say, speech communication cannot be continued. At the time of the manual transmission operation, whether or not to disconnect speech communication (step S406-YES) can be selected via a display key YES, or whether or not to cancel the manual transmission operation (step S406-NO) can be selected via a display key CANCEL.

The description of FIG. 4 will now be continued. If the start key 318 is pressed following the selection of a display key other than CANCEL on the operation screens 701, 702 displayed on the liquid crystal screen 310, the CPU 201 judges that the manual transmission operation is to be started (step S406-YES), and proceeds to step S407. In step S407, the CPU 201 causes the scanner 205 to read a placed document, and transfers and stores image data output from the scanner 205 into the RAM 203. The stored image data is read from the RAM 203, transferred to the compression processing unit 206 via the bus 218, compressed in accordance with, for example, JBIG that is applied in image communication, and then stored into the RAM 203 as compressed image data.

Subsequently, in step S408, the CPU 201 judges whether or not to perform T.38 digital facsimile communication. More specifically, if the operation screen 701 is displayed in step S405, the apparatus at the destination can also perform the T.38 digital facsimile communication, and therefore the processing proceeds to step S409. On the other hand, if the operation screen 702 is displayed, the apparatus at the destination cannot perform the T.38 digital facsimile communication, and therefore it is judged that T.30 digital facsimile communication is to be performed and the processing proceeds to step S413.

If the operation screen 701 is displayed (step S408-YES), it means that the item "continued speech communication" in FIG. 6 indicates OK, and image communication can be performed with continuation of the SIP session that has been established for media-type information of audio. For example, it is possible to establish another SIP session for media-type information of image and perform facsimile communication in accordance with a T.38 digital facsimile procedure. Therefore, in step S409, the CPU 201 needs to construct IP packets as T.38 communication data using the compressed image data stored in the RAM 203.

Next, in step S410, the CPU 201 judges whether or not to perform multi-session image communication, that is to say, whether or not to perform image communication with continuation of speech communication. If the display key YES has been selected on the operation screen 701, it means that multi-session image communication is to be performed with continuation of speech communication (step S410-YES), and therefore the CPU 201 establishes a SIP session for T.38 image communication. Thereafter, in step S411, the CPU 201 performs facsimile communication in the established session in accordance with a digital facsimile procedure compliant with the ITU-T recommendation T.38 via the network I/F control unit 217, and then ends the processing.

On the other hand, if the display key NO has been selected on the operation screen 701, it means that image communication is to be performed with disconnection of speech communication (step S410-NO), and therefore the processing proceeds to step S412. In step S412, the CPU 201 establishes another SIP session for image communication which is different from speech communication, and then ends the session that was used for speech communication. Thereafter, the CPU 201 proceeds to step S411 and performs facsimile communication in the established SIP session for image communication in accordance with a digital facsimile procedure compliant with the ITU-T recommendation T.38 via the network I/F control unit 217.

The foregoing example, in which a session established for speech communication is ended even though speech communication can be continued, is effective in the case where, for example, speech communication is unnecessary at the time of image communication and a reduction in the number of sessions suppresses the communication fee charged.

On the other hand, if the operation screen 702 is displayed (step S408-NO), it means that NG is set as the item "continued speech communication" in FIG. 6 and it is not possible to establish another SIP session for image communication which is different from the SIP session established for speech communication. Therefore, in order to perform image communication, T.30 facsimile communication based on deemed voice is performed in place of voice of the SIP session established for media-type information of audio.

In step S413, the CPU 201 modulates the compressed image data stored in the RAM 203 using the FAX modem 207 so as to convert the compressed image data into an analog signal of a voice band that can be transmitted via an analog line. Furthermore, in order to transmit the analog signal as deemed voice, VoIP-based coding processing is executed using the CODEC 210. Subsequently, the CPU 201 disconnects speech communication using the communication data thus constructed via the network I/F control unit 217 in step S414, and performs the T.30 facsimile communication based on deemed voice in place of voice in step S415.

If the display key CANCEL has been selected on the operation screens 701, 702 displayed on the liquid crystal screen 310, the CPU 201 ends the manual transmission operation (step S406-NO).

Modification Example

As has been described above, in the present embodiment, continued speech communication of the image communication information is referred to using a destination number, and the user is notified of whether or not speech communication can be continued through display on an operation screen. This notification of whether or not speech communication can be continued may be conducted through voice using the handset 208, instead of display on the operation screen. In this case, the manual transmission operation is performed by, for example, playing a voice guidance in the handset 208 and having the user perform appropriate key input accordingly.

Furthermore, in the present embodiment, if the called party is already performing speech communication, it may not be possible to perform a manual transmission operation of a facsimile function whereby image communication is performed in succession to confirmation of a destination via speech communication. In the case where OK is set as continued speech communication, which has been described earlier with reference to FIG. 6, it is possible to establish a SIP session for media-type information of image and perform facsimile communication in accordance with the T.38 digital facsimile procedure even if the called party is already performing speech communication. In this case, it is also possible to immediately start the transmission upon selection of a display key on an operation screen suggesting whether or not to perform normal image communication without performing speech communication. On the other hand, in the case where NG is set as continued speech communication, which has been described earlier with reference to FIG. 6, if the called party is already performing speech communication, it is not possible to newly perform image communication, and therefore, for example, the manual transmission operation may be switched so as to enable configuration of settings for scheduled image communication after speech communication is disconnected. Moreover, it is possible to cancel the manual transmission operation in the above-described manner under the assumption that, in case of an improper destination number, the other party of speech communication may issue an instruction for performing image communication with a destination number different from that of speech communication. In this case, the processing is ended in the present embodiment; alternatively, it is permissible to enable image communication with a destination number that is different from a destination number with which speech communication is being performed upon selection of a display key on a display suggesting whether or not to input a new destination number.

Second Embodiment

Figure 8A:
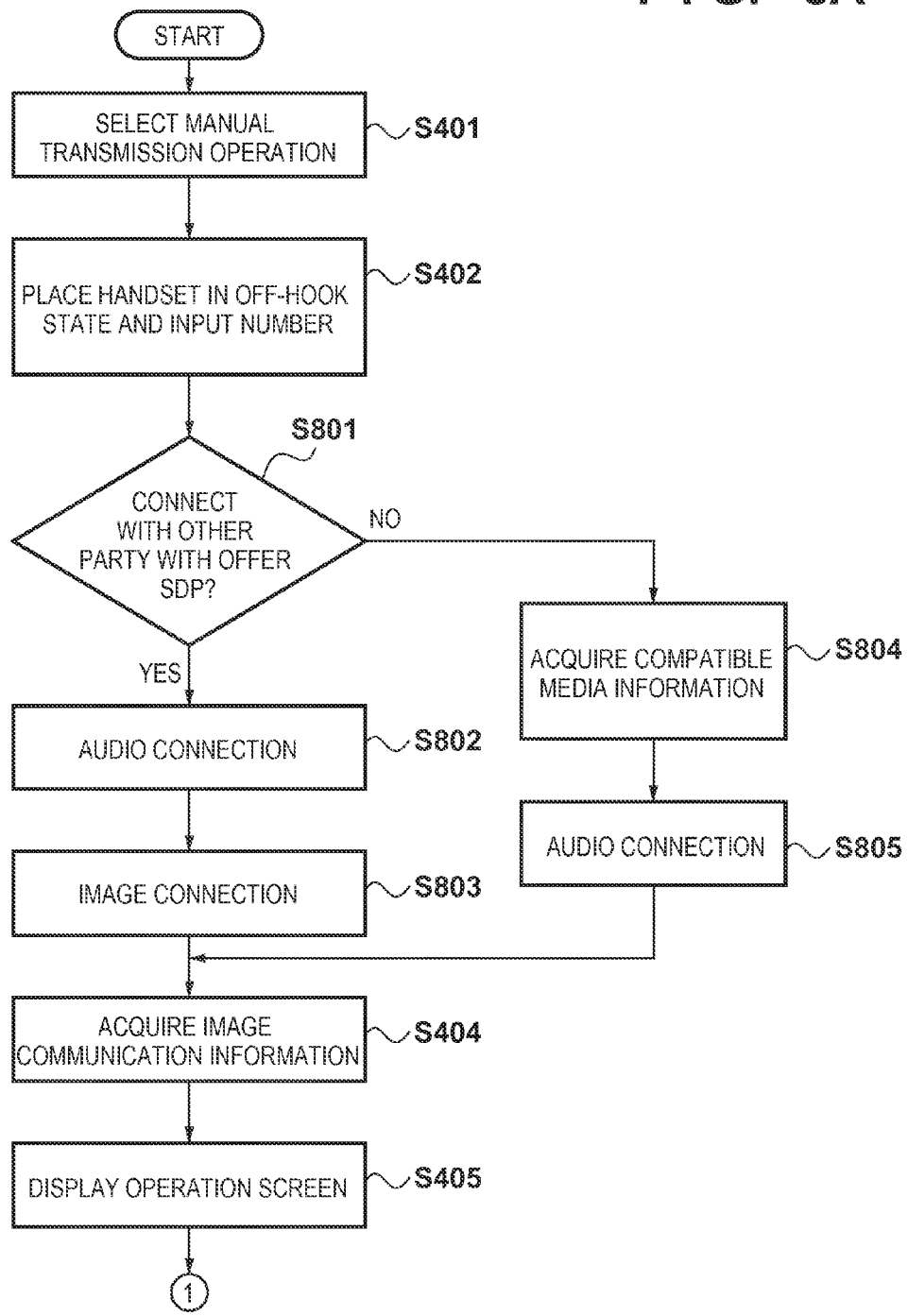
FIGS. 8A and 8B are flowcharts showing a processing flow according to a second embodiment.
Figure 8B:
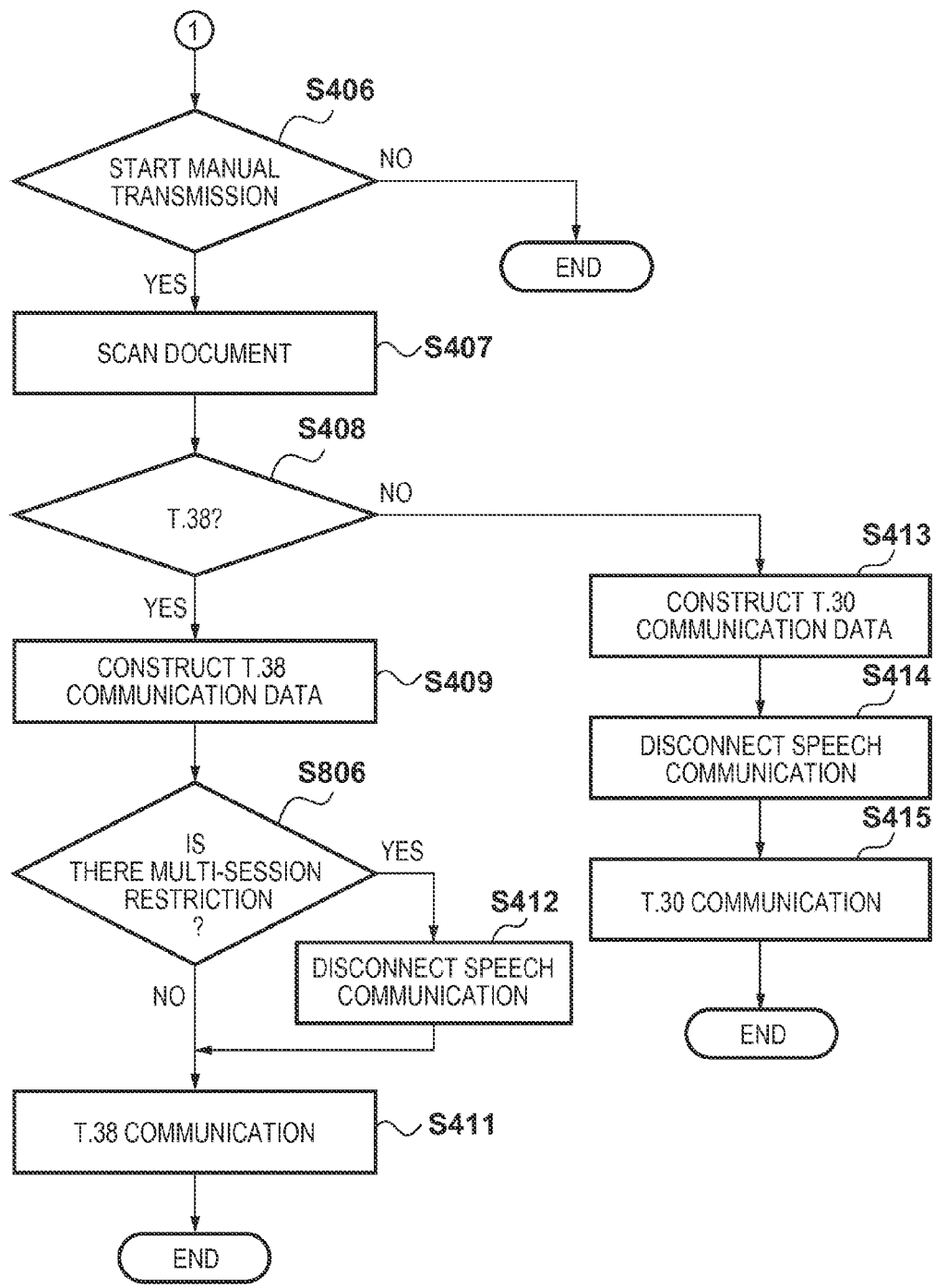

A second embodiment of the present invention will now be described with reference to FIGS. 8 to 10. First, a description is given of a processing procedure according to the present embodiment with reference to FIGS. 8A and 8B. In FIGS. 8A and 8B, as steps S401, S402, S404 to S409, and S411 to S415 are the same operations as the steps assigned the same reference signs in FIG. 4, a description thereof is omitted, and only different operations will be described below in detail. It should be noted that the processing procedure is realized by the CPU 201 of the image communication apparatus 101, which will be described below, reading a control program pre-stored in the ROM 202, the HDD 216, and the like into the RAM 203 and executing the read control program. The present embodiment differs from the above-described first embodiment in that image communication information is acquired from the image communication apparatus (external apparatus) 102 of the other party.

In step S801, the CPU 201 judges whether or not to establish connection with the other party with inclusion of an offer SDP. With reference to FIG. 5, the description has been given of the case where a SIP session is established through transmission of a SIP connection request message (INVITE) including an offer SDP between the image communication apparatuses 101 and 102. In the case where the offer SDP is thus included (step S801-YES), the CPU 201 establishes a SIP session for media-type information of audio in step S802 so as to perform speech communication via voice as indicated by 500 in FIG. 5. Next, in step S803, the CPU 201 proposes whether or not a SIP session can be established for media-type information of image. Here, as indicated by 510 in FIG. 5, it proposes performance of image communication through T.38 facsimile communication using m=image 9000 TCP. It means that if the SIP session can be established for media-type information of image, image communication can be performed with continuation of speech communication, and if the SIP session cannot be established, image communication cannot be performed with continuation of speech communication. Therefore, in step S404, the CPU 201 establishes the SIP session for media-type information of audio (voice communication) and performs speech communication. Furthermore, by proposing the establishment of the SIP session for media-type information of image (image communication), it is possible to acquire image communication information indicating whether or not OK is set as "continued speech communication".

On the other hand, if the CPU 201 judges in step S801 that the offer SDP is not to be included in connecting with the other party, it proceeds to step S804, acquires compatible media information from the apparatus of the other party, and establishes a SIP session based on the acquired information in step S805. With reference to FIG. 9, a description is now given of the processes of steps S804 and S805 for the case where the offer SDP is not included (step S801-NO). Specifically, the following describes a sequence for the case where the image communication apparatus 102 wishes to establish a SIP session by transmitting a SIP connection request message (INVITE) that does not include an offer SDP to the image communication apparatus 101.

In step S901, the image communication apparatus 102 transmits an INVITE message to the image communication apparatus 101. The INVITE message does not include the offer SDP shown in FIG. 5. When the image communication apparatus 101 receives the INVITE message addressed to itself, it checks whether or not the offer SDP is included therein. As the offer SDP is not included therein, the image communication apparatus 101 transmits, in step S902, a 200 OK message including an offer SDP describing media information with which it is compatible and a receiving port number corresponding thereto. Here, the offer SDP describes m=image 9000 TCP and m=audio 5004 UDP. That is to say, in step S804, the CPU 201 proposes a SIP session for performing one or both of data communication for media-type information of image using a TCP port number 9000 and data communication for media-type information of audio using a UDP port number 5004.

In step S903, the image communication apparatus 102 examines the offer SDP included in the received 200 OK message, and if the offer SDP describes compatible media information, transmits an ACK message indicating that the 200 OK message has been received. The ACK includes an SDP describing media information and a receiving port number accepted by the image communication apparatus 102. Here, the description m=audio 5004 UDP indicates agreement on establishment of the SIP session for performing data communication for media-type information of audio using a UDP port number 5004 as a receiving port. Consequently, in step S805, the SIP session for realizing data communication based on the media information (audio) that both of the image communication apparatuses 101 and 102 have agreed on is established therebetween.

Here, it is proposed that a SIP session for performing one or both of data communication for media-type information of image and data communication for media-type information of audio can be established, and it is hence understood that OK is set as "continued speech communication" in FIG. 6. On the other hand, if the image communication apparatus 102 does not propose that a SIP session for performing data communication for media-type information of image can be established, it is understood that NG is set as "continued speech communication" in FIG. 6, which consequently makes it possible to acquire the image communication information (step S404).

Figure 10:
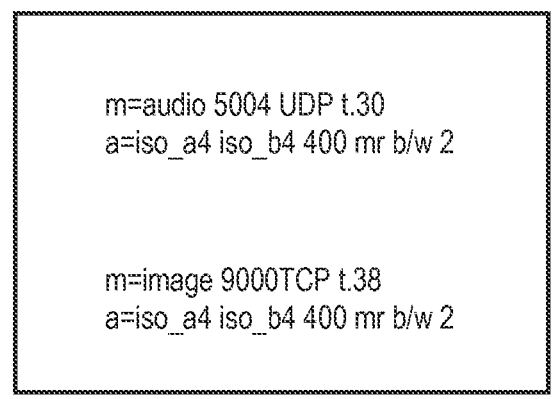
FIG. 10 shows examples of SDP media streams declaring T.30 and T.38 facsimile communication methods according to the second embodiment.

The following describes examples of descriptions of SDP media streams for declaring the T.30 and T.38 facsimile communication methods used in the present embodiment with reference to FIG. 10. In these examples, as has been stated earlier, the description m=audio 5004 UDP indicates declaration of the establishment of a SIP session for performing data communication for media-type information of audio using a UDP port number 5004 as a receiving port. Similarly, the description m=image 9000 TCP indicates declaration of the establishment of a SIP session for performing data communication for media-type information of image using a TCP port number 9000 as a receiving port.

Figure 9:
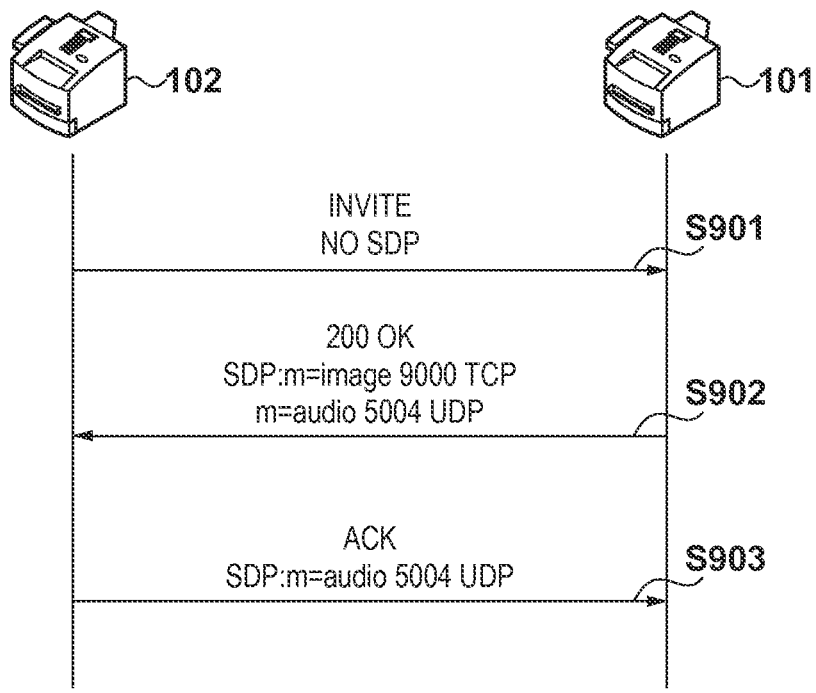
FIG. 9 shows a sequence for establishing a SIP session according to the second embodiment.

In FIGS. 5 and 9, the T.30 facsimile communication method and the T.38 facsimile communication method are used for media-type information of audio and media-type information of image, respectively; alternatively, other different methods may be mixed, such as the case of the ITU-T recommendation T.37 for an Internet facsimile communication method. In this case, it is possible to directly declare and specify a facsimile communication method by, for example, describing t.30 or t.38 in a media stream at the end of the m line, as shown in the examples of the descriptions of FIG. 10.

Here, more detailed parameter information can be acquired through further expansion of a media stream description of an SDP. A SIP message stores, for example, SDP information called the "a" line in addition to the "m" line, and the "a" line can describe media-type information (audio, video, data), a communication method (two-way communication, one-way communication), and various other types of parameters.

In the examples of FIG. 10, the "a=" syntax declares a=iso_a4 iso_b4 400 mr b/w 2 as image communication control parameters used in image communication. Here, iso_a4 and iso_b4 indicate A4 and B4 sizes as recording sheet sizes. This syntax can also be used in declaring a size of a document corresponding to a transmitted or received image, in which case only one type of size is generally designated. Also, 400 in FIG. 10 indicates that the transmitted or received image has a resolution of 400 dpi. Furthermore, mr indicates that a processable image compression method is MR. Furthermore, b/w denotes a black-and-white image. Furthermore, 2 described after b/w denotes the number of sessions that can be established simultaneously. While a facsimile communication method is declared in the "m" line in the present examples, a facsimile communication method may be declared in the "a=" syntax for further expansion.

By thus acquiring the image communication control parameters through the establishment of a SIP session under agreement between a terminal of a calling party and a terminal of a called party, it is possible to acquire, in advance, image communication information indicating whether or not image communication can be performed with continuation of speech communication. The description of FIGS. 8A and 8B will now be continued. When the construction of the T.38 communication data is ended in step S409, the CPU 201 judges whether or not there is a multi-session restriction in step S806. For example, in the case where the aforementioned number of sessions is restricted to one and therefore m=image 9000 TCP cannot be established after the establishment of media-type information of audio, image communication is performed in step S411 after disconnecting speech communication in step S412 (step S806-YES). On the other hand, in the case where there is no restriction on the number of sessions (step S806-NO), the CPU 201 performs image communication with continuation of speech communication in step S411.

Third Embodiment

The following describes a third embodiment of the present invention with reference to FIGS. 11A to 15. It should be noted that a description of configurations and techniques that are similar to those of the first and second embodiments described above will be omitted. The configurations of the network system and the image communication apparatus 101 are similar to the configurations described with reference to FIGS. 1 and 2. The present embodiment differs from the above-described embodiments in that, even in the case where image communication (FAX communication) is to be performed without continuing voice communication (speech communication), voice communication is disconnected temporarily, and connection for voice communication is re-established after performing image communication. In this manner, the user feels as if speech communication is continuous.

<Operation Unit>

Figure 11A:
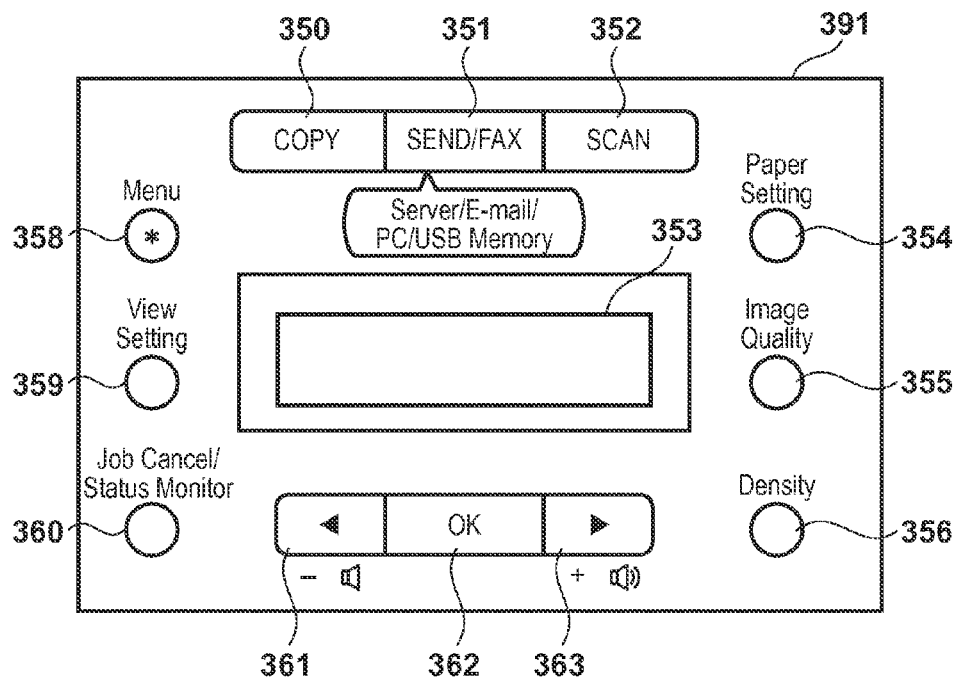
FIGS. 11A and 11B are plan views showing a configuration of an operation panel according to a third embodiment.
Figure 11B:
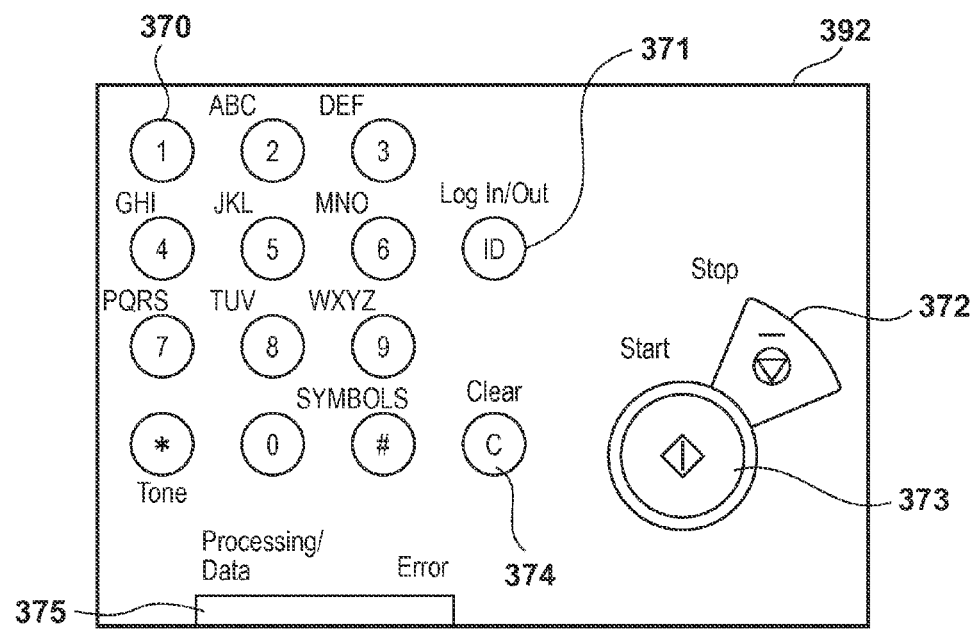
Figure 12A:
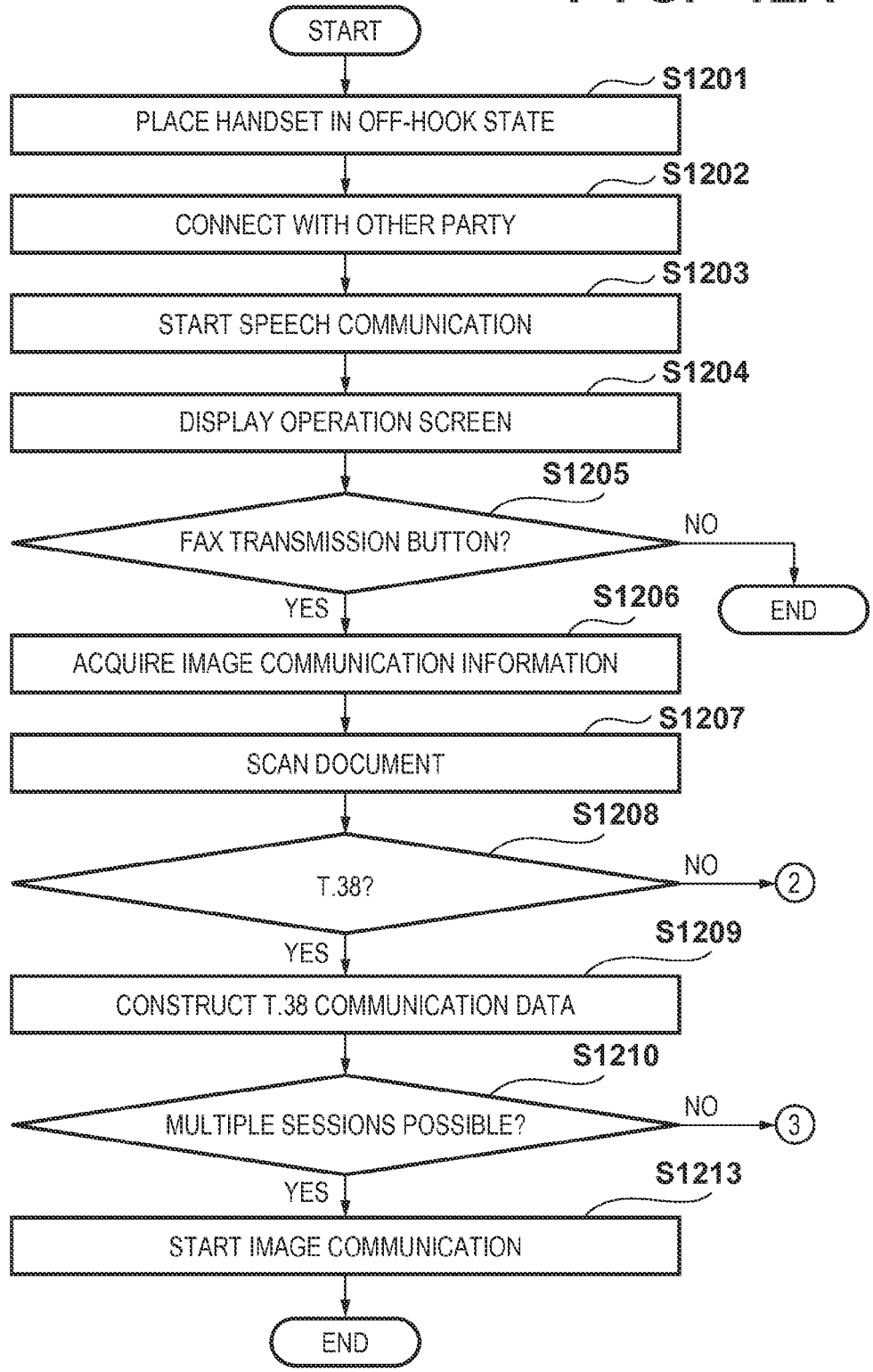
Figure 12B:
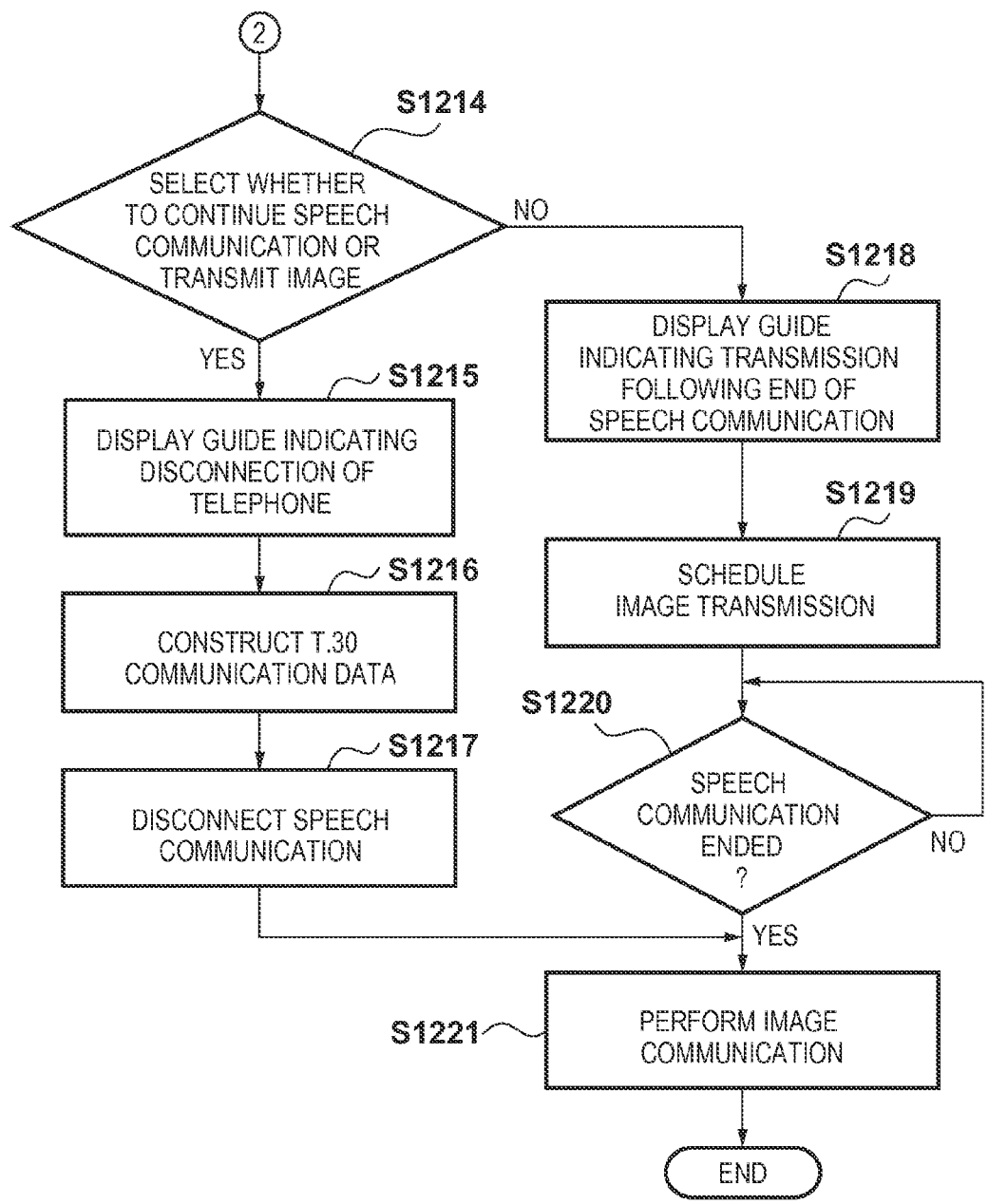

First, a description is given of an operation unit according to the present embodiment with reference to FIGS. 11A and 11B. In these figures, 391 indicates a detailed configuration of the operation panel 213, and 392 indicates a detailed configuration of the key operation unit 211. The operation unit is composed of the key operation unit 211, the panel control unit 212, and the operation panel 213, and as indicated by 392, the key operation unit 211 is composed of numeric keys 370 for dialing, Start 373, and Stop 372. As indicated by 391, the operation panel 213 is composed of keys for main operations and a liquid crystal display apparatus. The panel control unit 212 performs display control for the liquid crystal display apparatus and sensing of keys (detection of pressing of keys).

A description is now given of key switches and a liquid crystal display apparatus of the operation panel 213 with reference to 391. COPY 350 is a key for selecting a COPY mode. SEND/FAX 351 is a key for selecting a SEND mode or a FAX mode. SCAN 352 is a key for selecting a SCAN mode. A liquid crystal display apparatus 353 displays messages, operation modes, operation statuses, and the like. It displays menus, selection items, characters, numbers, and the like in configuration of various settings.

Paper Settings 354 is a key for setting a sheet size of a recording sheet (cassettes, manual). Image Quality 355 is a key for selecting an image quality mode for copying (character mode, character/photograph mode, photograph mode), and selecting a resolution for a facsimile. Density 356 is a key for setting a density for copying. Menu 358 is a key for selecting various modes. View Settings 359 is a key for confirmation of settings. Job Cancel/Status Monitor 360 is a key for cancelling various jobs and for confirmation of a print status, a copy status, a scan status, or a report output status. A left arrow/minus key (<-) 361 is for turning down a sound volume of a monitor, reducing numeric values of various settings, and displaying an immediately previous setting, item, and the like. A right arrow/plus key (>+) 363 is for turning up the sound volume of the monitor, increasing the numeric values, and displaying the next setting, item, and the like. OK 362 is a key for deciding on various registrations and configured settings.

Next, a description is given of the key operation unit 211 with reference to 392. The numeric keys 370 are for inputting dial numbers and numeric values of various settings. ID 371 is a key used in setting a personal identification number. Stop 372 is a key for ceasing a job, and is used to perform resetting when a mode is being set. Start 373 is a key for starting a job. Clear 374 is a key for clearing a number, such as the number of copies, and a character. Processing 375 is a lamp that flashes when the apparatus is in operation, and is lit when there is a job waiting.

<Processing Procedure>

A processing procedure according to the present embodiment will now be described with reference to FIGS. 12A to 15. The following describes an exemplary operation of the image communication apparatus for the case where image communication is performed while speech communication is being continued over a telephone. It should be noted that the processing procedure is realized by the CPU 201 of the image communication apparatus 101, which will be described below, reading a control program pre-stored in the ROM 202, the HDD 216, and the like into the RAM 203 and executing the read control program.

In step S1201, after the handset 208 of the image communication apparatus 101 is lifted and placed in an off-hook state, the CPU 201 detects input of a destination number (a telephone number of the image communication apparatus 102) via the numeric keys of the key operation unit 211. Next, in step S1202, the CPU 201 establishes a SIP session with a terminal of a called party using the SIP function and starts a connection operation. As has been described earlier in the first embodiment, in a SIP session, a terminal of a calling party transmits a SIP session establishment request (INVITE) to a terminal of a called party, and the terminal of the called party returns a success response to the terminal of the calling party in response to the received INVITE. Upon receiving the success response, the terminal of the calling party transmits ACK to the terminal of the called party, thus establishing the SIP session. A medium used in the SIP session is determined by the calling party and the called party exchanging with each other an SDP (Session Description Protocol) describing, for example, a medium they wish to use and a port number for receiving the medium (SDP negotiation). Therefore, in step S1203, a speech communication session is established and speech communication can be performed.

Subsequently, in step S1204, the CPU 201 displays an operation guide. In the case where the user performs FAX transmission during speech communication, an operation is performed in accordance with this guide. An operation guide 1505 shown in FIG. 15, that is to say, "For FAX transmission, please set document and press Start key." is displayed on the liquid crystal display apparatus of the operation panel 213 so as to notify the user of the same. Then, in step S1205, the CPU 201 judges whether or not a FAX transmission button has been pressed. In order to perform image transmission with continuation of speech communication, the user sets a document, selects the FAX mode via the SEND/FAX button of the operation panel 213, and presses the Start key. Once the FAX transmission button has been pressed, the CPU 201 proceeds to step S1206, confirms image communication information indicating an image communication capability of the other party, and acquires a communication format as well as session information. Next, in step S1207, the CPU 201 causes the scanner 205 to scan the document to be transmitted and stores image data into the RAM 203. On the other hand, if it is judged in step S1205 that the FAX transmission button has not been pressed, the telephone is continued without performing FAX communication.

Subsequently, in step S1208, the CPU 201 judges whether or not to perform T.38 digital facsimile communication. It proceeds to step S1209 if the communication is to be performed in compliance with T.38, and proceeds to step S1214 if the communication is not to be performed in compliance with T.38, that is to say, if the communication is to be performed in compliance with T.30. Here, "communication method T.30" indicates the case where the image communication apparatuses 101 and 103 in FIG. 1 communicate with each other; in this case, the image communication apparatus 103 is compatible with T.30. This is a transmission control protocol for realizing facsimile communication via a transmission path of a circuit-switched PSTN type. A G3 method is specified in which an image is transmitted at a maximum transmission rate of 33.6 kbit/s using an analog telephone line for subscribers. At the time of handshaking upon connection, communication is performed through HDLC in accordance with a modem standard of V.21 (300 bit/s), and in subsequent image transmission, V.34 that offers a maximum of 33.6 kbit/s can be used. However, with the circuit-switched PSTN type, data communication is analog, and a plurality of channels cannot be communicated simultaneously via a single line. For this reason, speech communication over a telephone and FAX communication cannot be performed simultaneously.

Therefore, a guide is displayed on the liquid crystal display apparatus of the operation panel 213 so as to make the user select whether to continue speech communication or perform image communication with disconnection of the telephone. The CPU 201 causes a display unit of the operation panel 213 to display a selection screen 1501 shown in FIG. 15, that is to say, "Continue telephone FAX transmission". In step S1214, the CPU 201 detects, on the foregoing selection screen, the setting selected by the user via the left arrow/minus key 361 or the right arrow/plus key 363 of the operation panel 213. If the user selects FAX transmission with which the telephone is to be disconnected, an operation similar to a conventional operation follows. In this case, in step S1215, the CPU 201 displays a message 1502 shown in FIG. 15, that is to say, "Disconnecting telephone." on the operation panel 213. Thereafter, the CPU 201 constructs T.30 communication data in step S1216, disconnects the telephone in step S1217, performs T.30 image communication in step S1221, and ends the processing.

On the other hand, if "Continue speech communication" is selected in step S1214, the CPU 201 notifies the user of an operation guide 1504 shown in FIG. 15, that is to say, "After speech communication ends, FAX transmission is performed." by displaying the same in step S1218. If there is no hurry on FAX transmission, "Continue speech communication" may be selected. The CPU 201 enters a transmission schedule mode in step S1219, and waits until speech communication is ended in step S1220. If the CPU 201 detects the end of speech communication (step S1220-YES), it proceeds to step S1221, continuously performs FAX transmission without releasing the line, that is to say, in the state where the line connected, and then ends the processing. After the speech communication, the user can perform the transmission automatically without paying attention to the transmission schedule.

On the other hand, in the case where the T.38 digital facsimile transmission is to be performed, the CPU 201 constructs FAX data (T.38 communication data) in step S1209. Here, it constructs information indicating whether the transmission is performed at one time or the transmission is divided and performed over multiple times based on the number of documents and on an amount of data of documents. More specifically, if the amount of data is larger than a predetermined value, the data is divided into pieces and the divided pieces of the data are transmitted over multiple times. Next, in step S1210, the CPU 201 judges whether or not to perform multi-session image communication with continuation of speech communication. Here, for example, it is preferable that the display indicated by 701, which has been described earlier in the first embodiment, be displayed on the operation panel 213 and the judgment be made based on information selected via this display. If multiple sessions are not to be performed, that is to say, in the case of a single session, the processing proceeds to step S1231. In this case, a session for audio (voice) and a session for image cannot be used simultaneously. Therefore, communication is performed by switching between the sessions using a time-sharing scheme while continuing speech communication. In this operation, FAX transmission is performed while maintaining the state where speech communication is being continued.

Once the CPU 201 has proceeded to step S1232, it notifies the user of an operation status by displaying a message 1503 shown in FIG. 15, that is to say, "FAX transmission is in progress, please wait." on the operation panel 213. In this way, the user acknowledges that FAX transmission is in progress while continuing the speech communication, and therefore hopefully becomes tolerant of the upcoming situations. Subsequently, in step S1233, the CPU 201 switches from a session for media-type information of audio (voice) to a session for media-type information of image (T.38), that is to say, performs the telephone and FAX transmission using a time-sharing scheme. In step S1234, the CPU 201 performs T.38 digital facsimile transmission. A T.38 FAX communication protocol allows instantaneous FAX transmission because a communication time period thereof is short, or more specifically, approximately ⅓₀ to ¹⁄₁₀₀ of that of analog T.30 for a single-page document of a standard A4 size. If faster communication becomes possible in the future, a time period for image communication can be further reduced. Once the FAX transmission has ended, the CPU 201 immediately switches from the session for media-type information of image (T.38) back to the session for media-type information of audio (voice) in step S1235, thereby returning back to the state of speech communication in step S1236.

The user can perform FAX transmission almost without feeling a temporary interruption of voice. With regard to the timing for switching between sessions, it is possible to minimize a temporary interruption of speech communication that the user feels by switching from a session for audio (voice) to a session for aplli. (T.38) upon, for example, detection of a state of silence during speech communication via voice. While the above-described FAX transmission is performed under the assumption that a single document of a standard A4 size is used, if a plurality of documents are used or a document of a high image quality is used, an amount of image data increases, and therefore a time period of FAX communication is extended. In this case, the effect of the temporary interruption of speech communication during FAX transmission can be minimized by transmitting the documents one by one, and by switching between the sessions each time the transmission is performed. On the other hand, in the case where the amount of image data is large, the effect of the temporary interruption of speech communication can be alleviated by performing control for dividing the data into pieces and transmitting the divided pieces of the data in units of a predetermined data amount, and for switching between the sessions each time the transmission is performed. However, in this case, the receiving party needs to have a system for organizing received images on a page-by-page basis.

Figure 13:
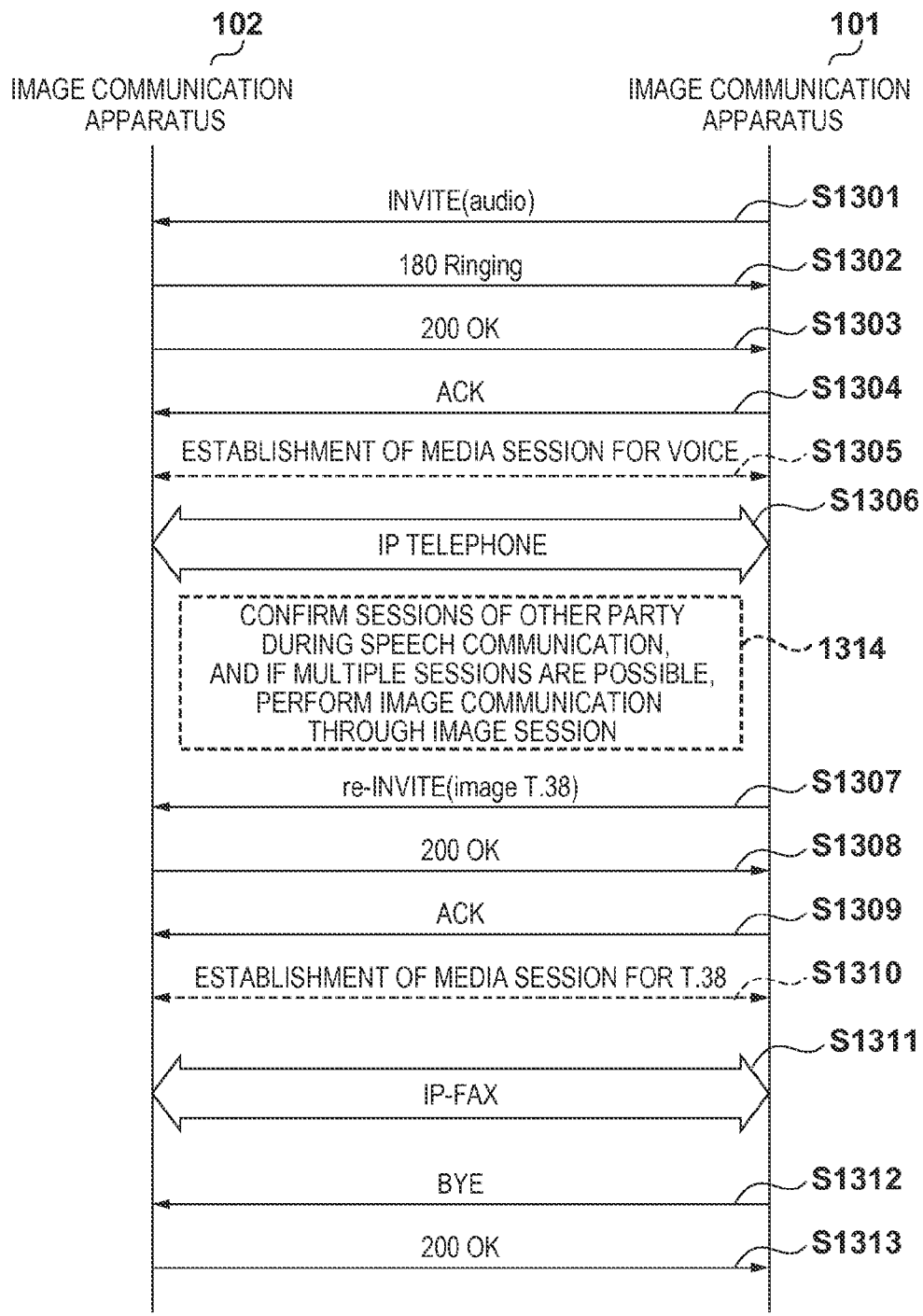
FIG. 13 shows a sequence for establishing multiple SIP sessions according to the third embodiment.

The following describes a sequence for establishing a SIP session with reference to FIG. 13. This sequence pertains to the case where the image communication apparatus 101 according to the present embodiment wishes to establish a SIP session by transmitting a SIP connection request message INVITE (audio) to the image communication apparatus 102.

First, in step S1301, the image communication apparatus 101 makes a request to the image communication apparatus 102 for an audio session by transmitting an INVITE (audio) message thereto. The INVITE message includes an SDP (Session Description Protocol) describing media information and a receiving port number that are wished to be used in the SIP session. INVITE is transmitted for requesting the start of communication. Here, with the objective of speech communication, the establishment of the SIP session is proposed.

In step S1302, when the image communication apparatus 102 receives the INVITE message addressed to itself, it returns a provisional response, 180 Ringing, to the image communication apparatus 101. Next, in step S1303, the image communication apparatus 102 examines an offer SDP included in the INVITE message, and transmits a 200 OK message if the offer SDP describes compatible media information. The 200 OK message includes an SDP describing media information and a receiving port number accepted by the image communication apparatus 102. Here, the establishment of a SIP session for performing audio communication is agreed on.

Thereafter, in step S1304, when the image communication apparatus 101 has received the 200 OK message, it transmits an ACK message indicating that the 200 OK message has been received (acknowledgement of the establishment of the session) to the image communication apparatus 102. Consequently, the session for media-type information of audio is established in step S1305, and speech communication via voice over an IP telephone is started in step S1306.

The ACK message is transmitted when communication has been successfully started, e.g., when a success response has been returned in response to an INVITE message. The objective of transmission of the ACK message is to enable highly-reliable communication even when a low-reliability transport protocol, such as a UDP, is used. In other words, if a response to the INVITE message fails to be delivered, a transmitting party of the INVITE message keeps retransmitting the INVITE message, and a receiving party keeps retransmitting a response message (e.g., a 200 OK message) until the ACK message is delivered.

Consequently, the SIP session for realizing data communication based on the media information that both of the image communication apparatuses 101 and 102 have agreed on is established therebetween. Here, with the objective of performing speech communication over a telephone, a session for media-type information of audio is established following the ACK message. Thereafter, speech communication over an IP telephone can be performed between the image communication apparatuses 101 and 102.

Then, if it becomes necessary to perform image transmission during speech communication over a telephone, image communication is controlled with confirmation of a communication capability of the other party, as has been described earlier. As indicated by 1314, sessions of the other party are confirmed in step S1210, and if multiple sessions are possible, the image communication apparatus 101 transmits a SIP connection request message (re-INVITE (T.38)) to the image communication apparatus 102 in step S1307. In step S1308, the image communication apparatus 102 transmits a 200 OK message to the image communication apparatus 101 as compatible media information is described. Thereafter, the above-described sequence takes place until a session for media-type information of Appli.T.38 is established (step S1310).

In step S1311, upon establishment of the session (Appli.), image communication is performed through signal communication according to a procedure compliant with the ITU-T recommendation T.38. At this time, speech communication over the IP telephone is being continued. Once the communication is ended, the image communication apparatus 101 transmits a BYE message to the image communication apparatus 102 (session disconnection request) in step S1312. BYE is transmitted for ending communication. It may be transmitted from either a transmitting party or a receiving party of INVITE. In step S1313, the image communication apparatus 102 that has received the BYE message transmits a 200 OK message. Upon receiving the 200 OK message, the image communication apparatus 101 closes the session (session disconnection).

Figure 14:
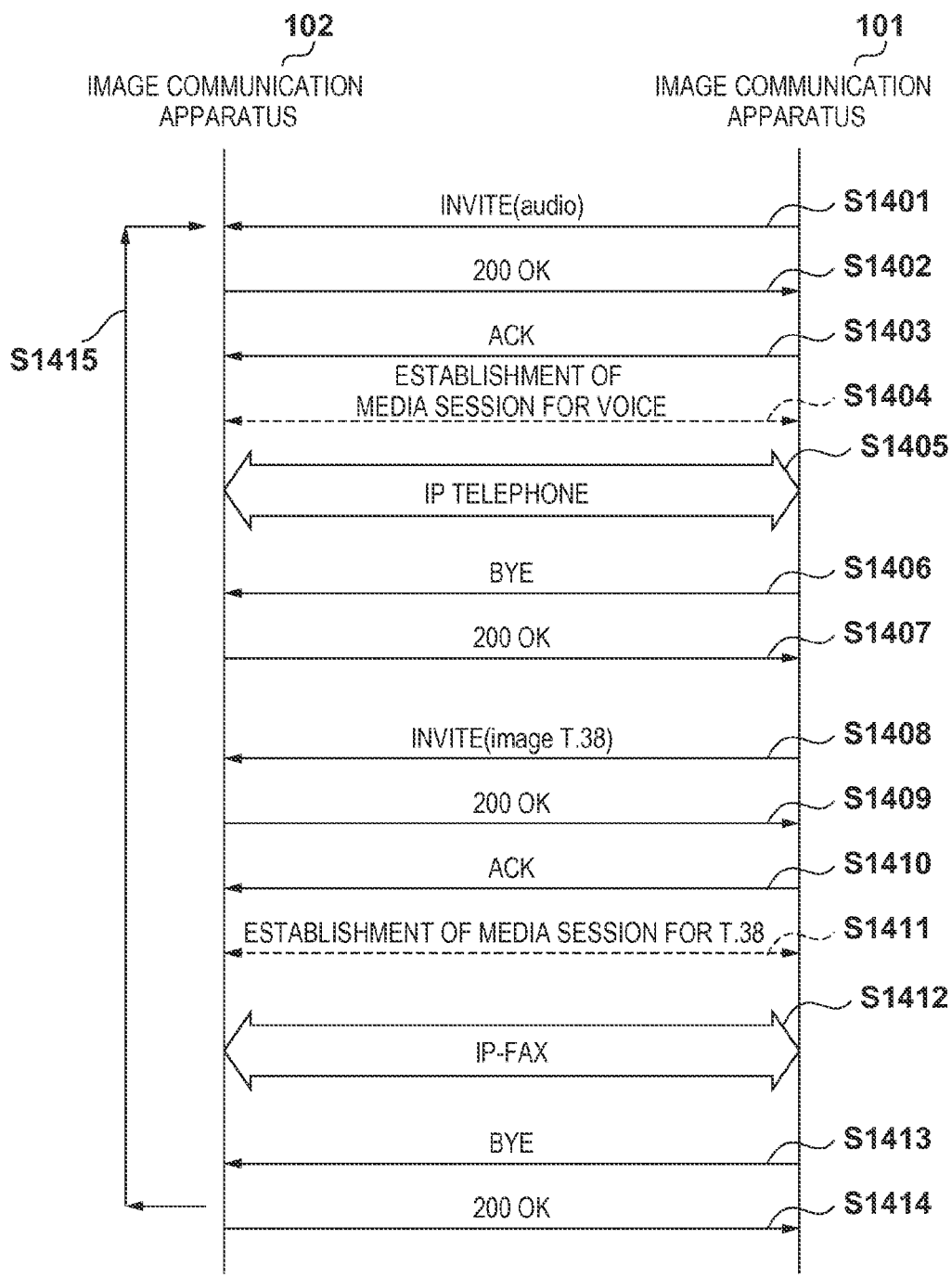
FIG. 14 shows a sequence for establishing a single SIP session according to the third embodiment.

The following describes a session sequence for performing a telephone and FAX transmission simultaneously in a single session with reference to FIG. 14. In the case of a single session, a session for audio and a session for image cannot be established simultaneously. Therefore, FAX communication is performed by switching between a session for a telephone (audio) and a session for T.38 (image) using a time-sharing scheme; in this manner, T.38 FAX transmission can be performed during seemingly continued speech communication. FIG. 14 shows a sequence for the case where the image communication apparatus 101 according to the present embodiment wishes to establish a SIP session by transmitting a SIP connection request message INVITE (audio) to the image communication apparatus 102.

In step S1401, the image communication apparatus 101 makes a request to the image communication apparatus 102 for an audio session by transmitting an INVITE (audio) message thereto. The INVITE message includes an SDP (Session Description Protocol) describing media information and a receiving port number that are wished to be used in the SIP session. INVITE is transmitted for requesting the start of communication. Here, with the objective of speech communication, the establishment of the SIP session is proposed.

In step S1402, when the image communication apparatus 102 receives the INVITE message addressed to itself, it examines an offer SDP included in the INVITE message, and transmits a 200 OK message if the offer SDP describes compatible media information. The 200 OK message includes an SDP describing media information and a receiving port number accepted by the image communication apparatus 102. Here, the establishment of a SIP session for performing audio communication is agreed on.

Thereafter, in step S1403, when the image communication apparatus 101 has received the 200 OK message, it transmits an ACK message indicating that the 200 OK message has been received (acknowledgement of the establishment of the session) to the image communication apparatus 102. Consequently, the session for media-type information of audio is established in step S1404, and speech communication via voice over an IP telephone is started in step S1405. The ACK message is transmitted when speech communication has been successfully started, e.g., when a success response has been returned in response to an INVITE message.

A description is now given of the case where it becomes necessary to perform image transmission during speech communication over a telephone. It will be assumed that communication capabilities of the other party have been confirmed to be T.38 and a single session. In step S1406, if it becomes necessary to perform FAX transmission while the telephone is being continued, the image communication apparatus 101 transmits a message BYE for session disconnection in order to briefly disconnect a session for audio. The image communication apparatus 102 transmits a 200 OK message in step S1407, which results in disconnection of the session for audio.

Next, in step S1408, the image communication apparatus 101 makes a request for a SIP session via INVITE (image T.38) in order to perform FAX transmission with the image communication apparatus 102. In step S1409, the image communication apparatus 102 transmits a 200 OK message to the image communication apparatus 101. Upon receiving the 200 OK message, the image communication apparatus 101 returns an ACK message in step S1410. In step S1411, the session (image T.38) is established.

Thereafter, in step S1412, the image communication apparatus 101 performs T.38 image communication with the image communication apparatus 102 for image data of a predetermined number of documents or a predetermined size. This communication is performed in the shortest period of time possible. As has been mentioned earlier, as T.38 allows 1 Mbps or higher speeds, a transmission time period can be further reduced in the future. After performing FAX transmission of predetermined image data, the session for image is immediately disconnected in steps S1413 and S1414. Then, through step S1415, the sequence returns to step S1401 so as to establish a session for audio and restore a telephone. If there is other image data, the above-described sequence is repeated until the transmission is completed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-111329 filed on May 27, 2013, which is hereby incorporated by reference herein in its entirety.

What is claimed is:

1. An image communication apparatus comprising:
   a detection unit configured to detect an instruction for performing image communication while performing voice communication with one external apparatus with which communication can be performed via a network;
   a voice communication unit configured to perform the voice communication with the external apparatus;
   an acquisition unit configured to acquire image communication information indicating an image communication capability of the external apparatus;
   a display unit configured to display, according to the instruction detected by the detection unit after the voice communication unit starts the voice communication, an operation screen related to the image communication based on the image communication information acquired by the acquisition unit, the operation screen including at least information indicating whether or not the voice communication can be continued while the image communication is performed; and
   a control unit configured to start the image communication in a case where a user input made via the operation screen displayed by the display unit indicates that the voice communication is to be continued while the image communication is performed, and terminate the voice communication and start the image communication in a case where the user input indicates that the voice communication is not to be continued while the image communication is performed,
   wherein at least one of the detection unit, the voice communication unit, the acquisition unit, or the control unit is implemented by a processor and a memory.

2. The image communication apparatus according to claim 1, wherein
   if the external apparatus can continue the voice communication while the image communication is performed, the display unit further displays the operation screen in a manner so as to enable selection of whether or not the voice communication is continued while the image communication is performed.

3. The image communication apparatus according to claim 1, wherein
   if the external apparatus cannot continue the voice communication while image communication is performed, the display unit further displays the operation screen in a manner so as to indicate disconnection of the voice communication while the image communication is performed and to enable selection of whether or not to perform the image communication.

4. The image communication apparatus according to claim 1, further comprising a creation unit configured to create image communication information of external apparatuses, on a per-apparatus basis, based on a communication history of the image communication that has been performed following the voice communication, and define the created image communication information in a table,
   wherein the acquisition unit acquires the image communication information of the external apparatus from the table created by the creation unit,
   wherein at least one of the detection unit, the voice communication unit, the acquisition unit, the control unit, or the creation unit t is implemented by the processor and the memory.

5. The image communication apparatus according to claim 4, wherein
   the image communication information includes a destination name and a destination address of the external apparatus, an updated date and time when the image communication information is defined in the table, and information of continued speech communication indicating whether or not image communication can be performed with continuation of speech communication via voice, and
   if a predetermined period of time has elapsed since the updated date, the creation unit updates the image communication information based on a new communication history.

6. The image communication apparatus according to claim 1, wherein
   the acquisition unit acquires the image communication information through user input.

7. The image communication apparatus according to claim 1, wherein
   the image communication is a facsimile communication according to a digital facsimile procedure compliant with an ITU-T recommendation T.38, or a facsimile communication according to a digital facsimile procedure compliant with an ITU-T recommendation T.30.

8. A control method for an image communication apparatus, comprising:

detecting an instruction for performing image communication while performing voice communication with one external apparatus with which communication can be performed via a network;

performing the voice communication with the external apparatus;

acquiring image communication information indicating an image communication capability of the external apparatus;

displaying, according to the detected instruction after the voice communication is started, an operation screen related to the image communication based on the acquired image communication information, the operation screen including at least information indicating whether or not the voice communication can be continued while the image communication is performed; and starting the image communication in a case where a user input made via the displayed operation screen indicates that the voice communication is continued while the image communication is performed, and terminating the voice communication and starting the image communication in a case where the user input indicates that the voice communication is not continued while the image communication is performed.

9. A non-transitory computer-readable storage medium storing a computer program for causing a computer to execute a method of controlling an image communication apparatus, the method comprising:

detecting an instruction for performing image communication while performing voice communication with one external apparatus with which communication can be performed via a network;

performing the voice communication with the external apparatus;

acquiring image communication information indicating an image communication capability of the external apparatus;

displaying, according to the detected instruction after the voice communication is started, an operation screen related to the image communication based on the acquired image communication information, the operation screen including at least information indicating whether or not the voice communication can be continued while the image communication is performed; and starting the image communication in a case where a user input made via the displayed operation screen indicates that the voice communication is continued while the image communication is performed, and terminating the voice communication and starting the image communication in a case where the user input indicates that the voice communication is not continued while the image communication is performed.

* * * * *